G. P. LEONARD.
FIRE ALARM.
APPLICATION FILED MAR. 22, 1907.

908,585.

Patented Jan. 5, 1909.
12 SHEETS—SHEET 1.

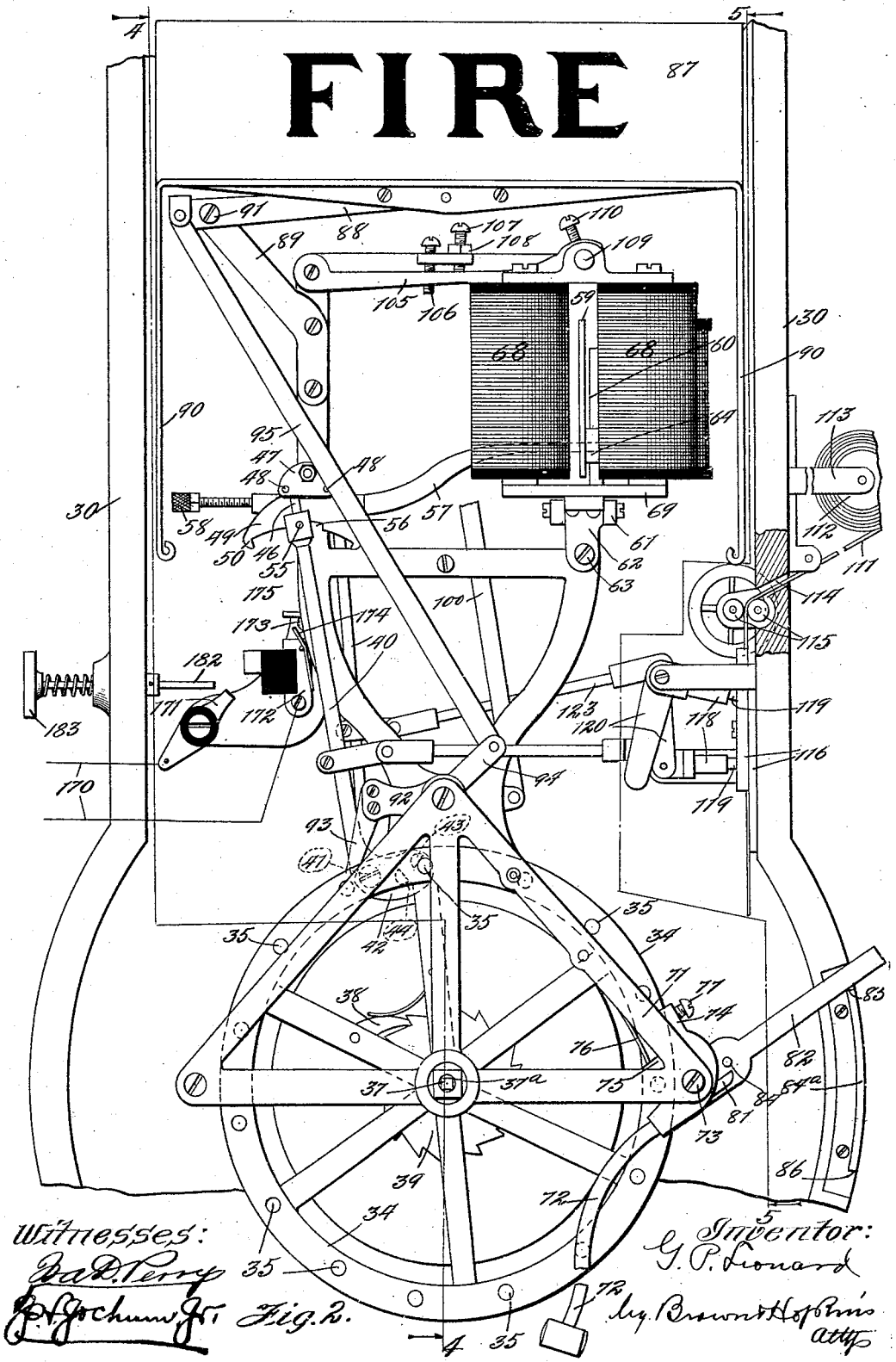

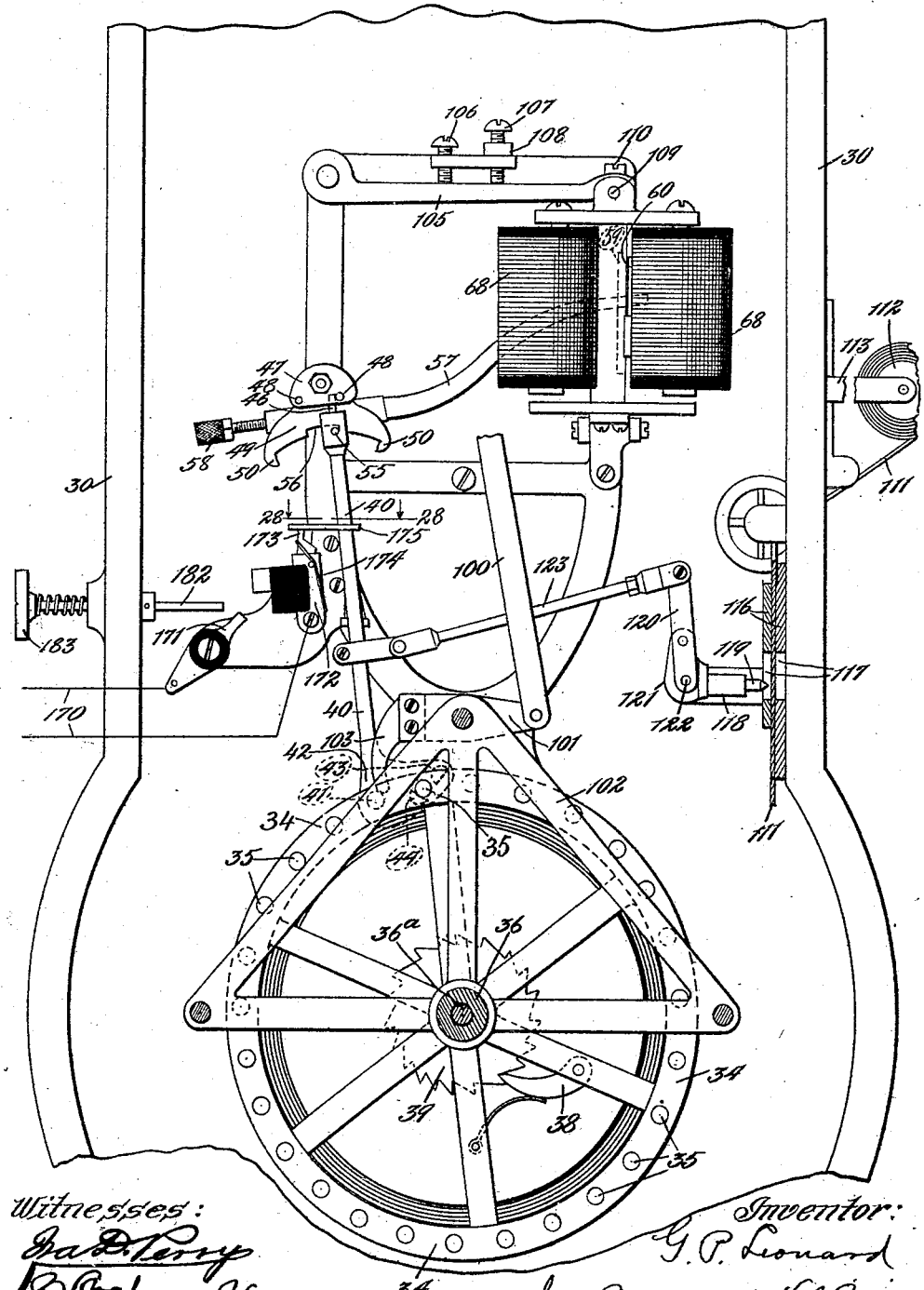

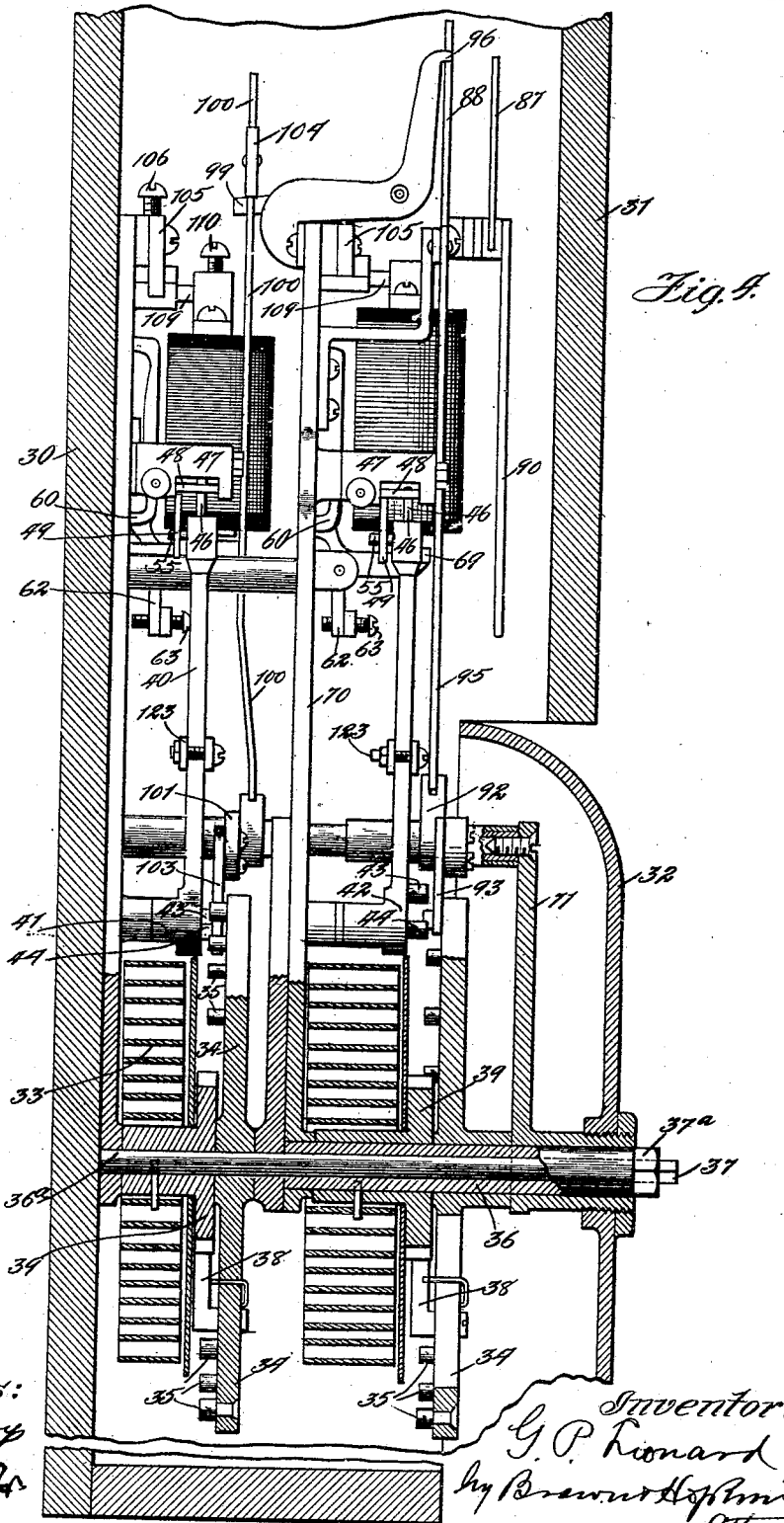

G. P. LEONARD.
FIRE ALARM.
APPLICATION FILED MAR. 22, 1907.
908,585.
Patented Jan. 5, 1909.
12 SHEETS—SHEET 5.
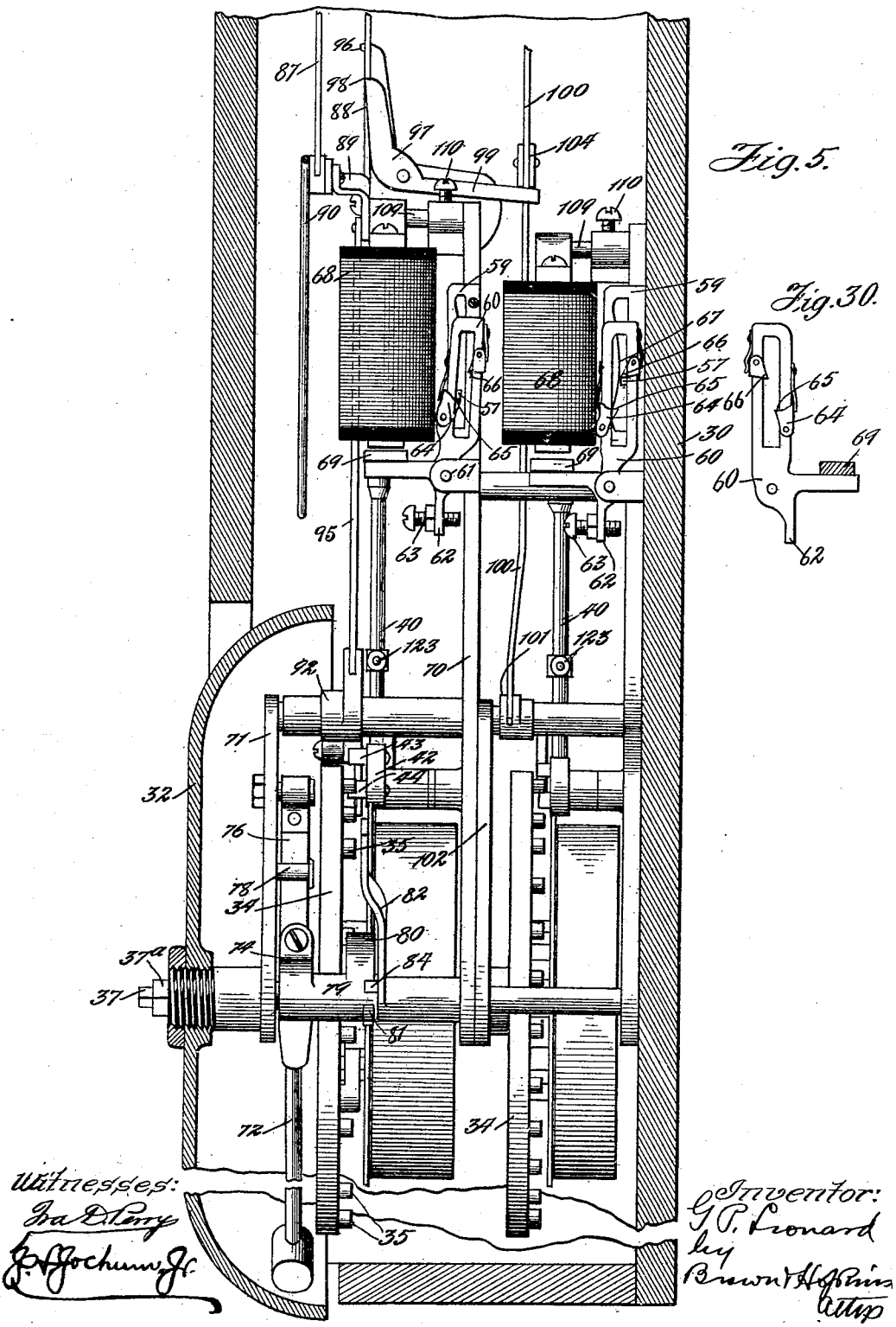

G. P. LEONARD.
FIRE ALARM.
APPLICATION FILED MAR. 22, 1907.
908,585.
Patented Jan. 5, 1909.
12 SHEETS—SHEET 6.
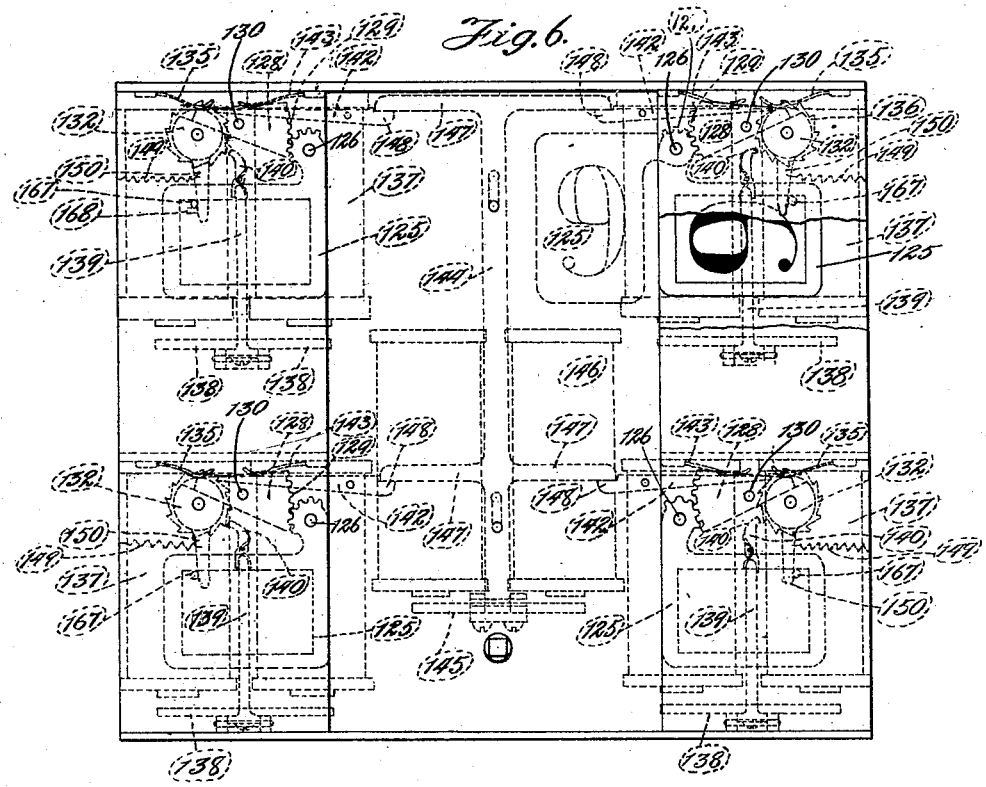
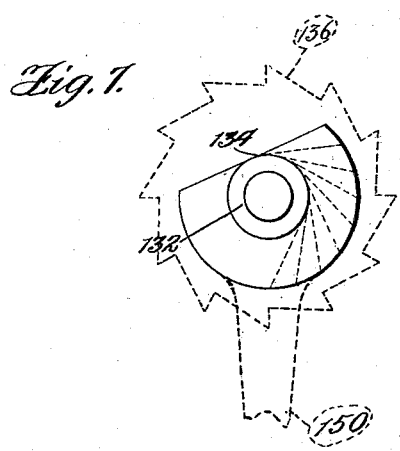
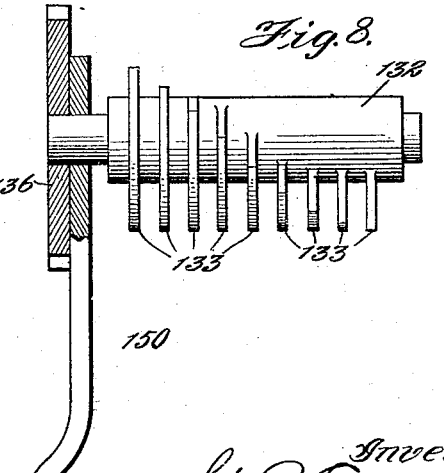
Witnesses:
Inventor:
G. P. Leonard
by Brown & Hopkins
Attys

G. P. LEONARD.
FIRE ALARM.
APPLICATION FILED MAR. 22, 1907.

908,585.

Patented Jan. 5, 1909.
12 SHEETS—SHEET 7.

Witnesses:
Inventor:
G. P. Leonard,
by Brown & Hopkins
Attys

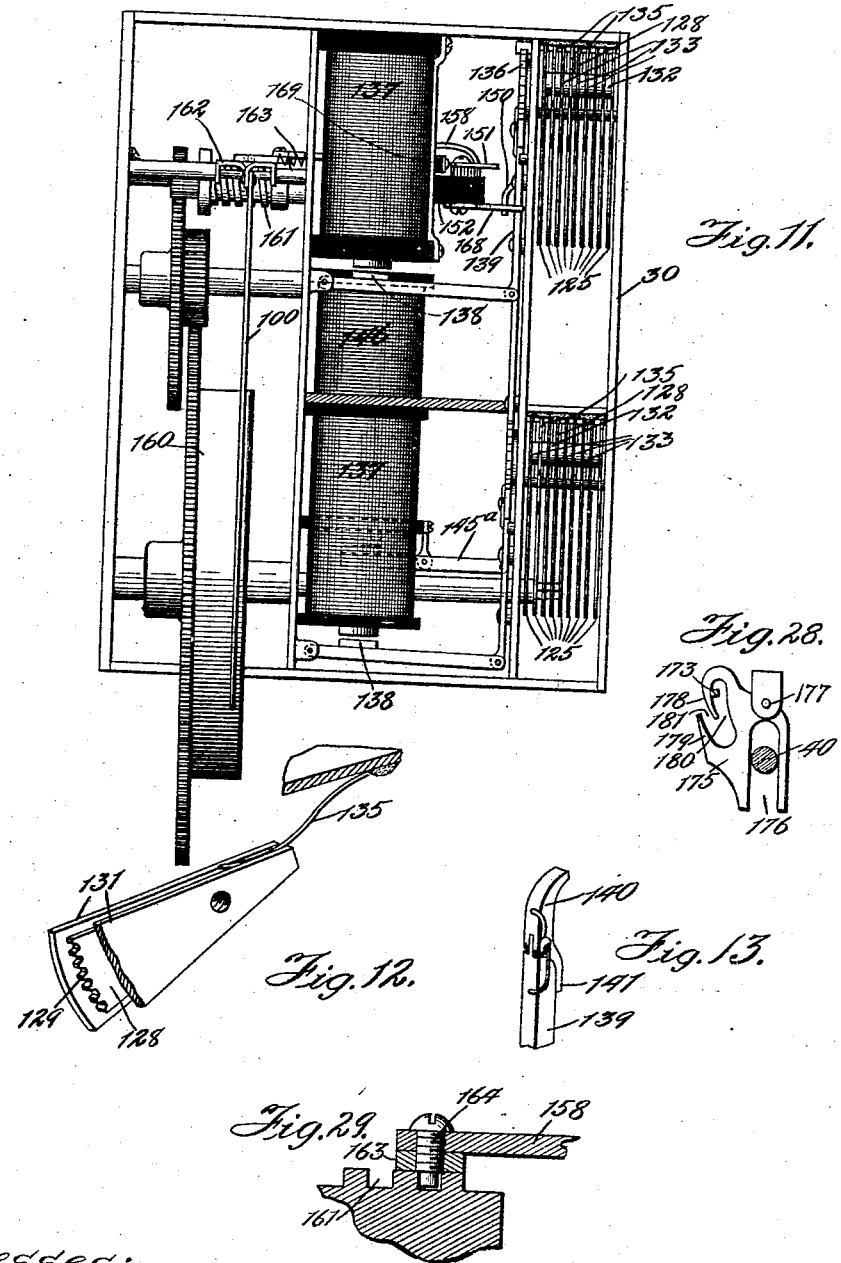

G. P. LEONARD.
FIRE ALARM.
APPLICATION FILED MAR. 22, 1907.
908,585.
Patented Jan. 5, 1909.
12 SHEETS—SHEET 9.
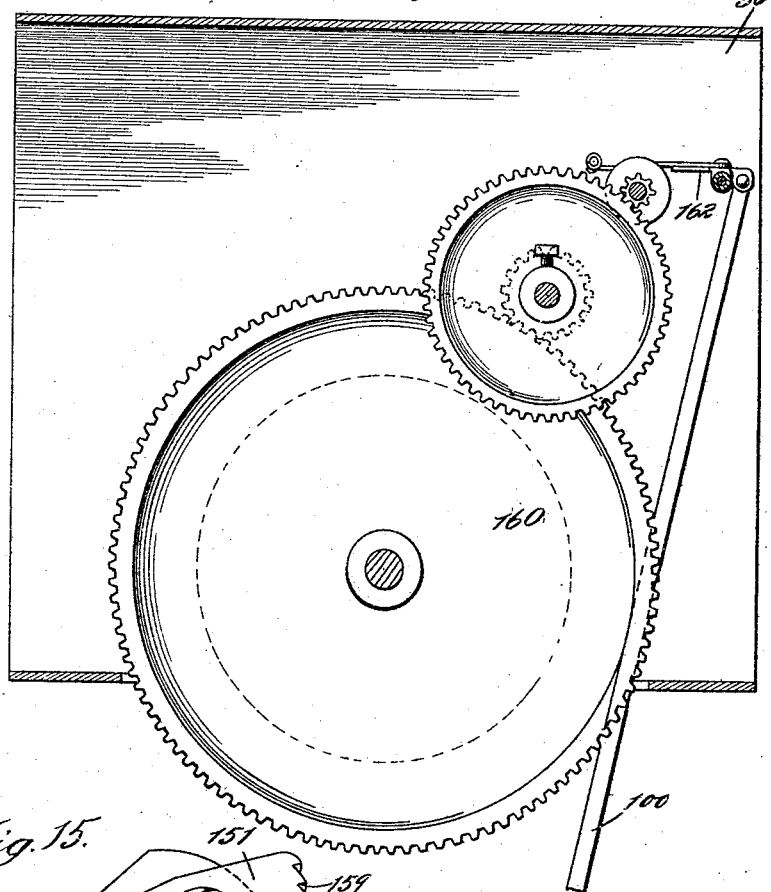
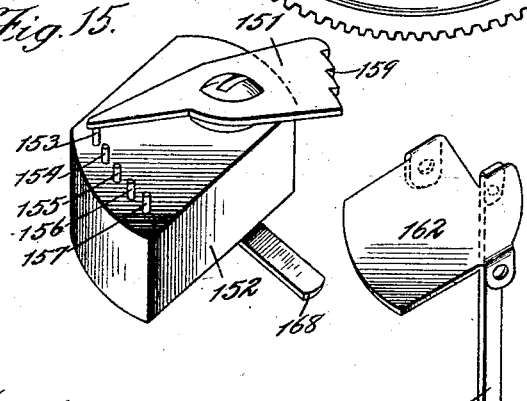

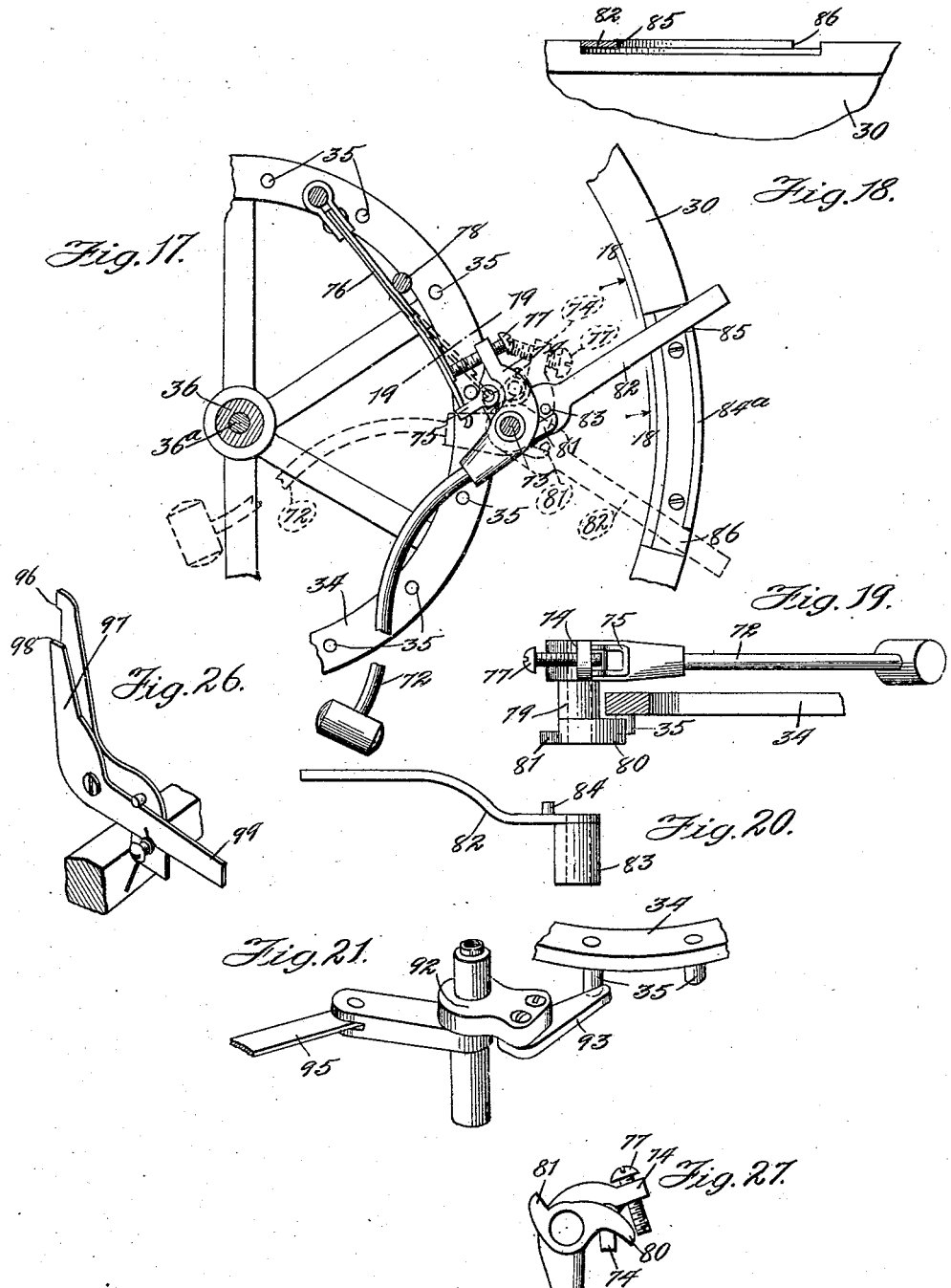

G. P. LEONARD.
FIRE ALARM.
APPLICATION FILED MAR. 22, 1907.
908,585.
Patented Jan. 5, 1909.
12 SHEETS—SHEET 11.
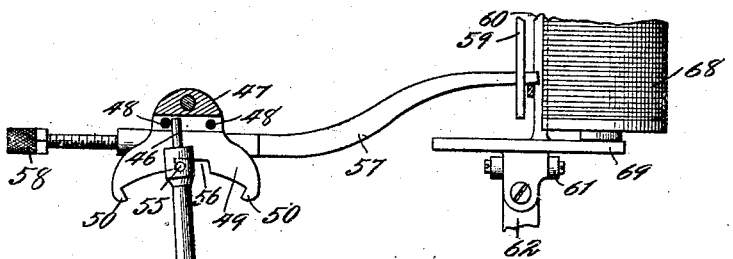
Fig. 22.
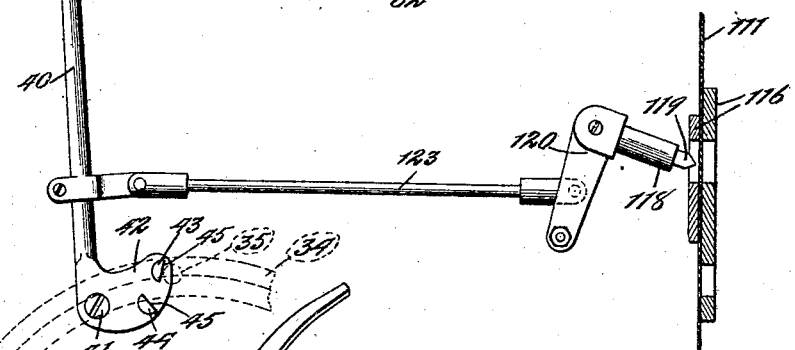
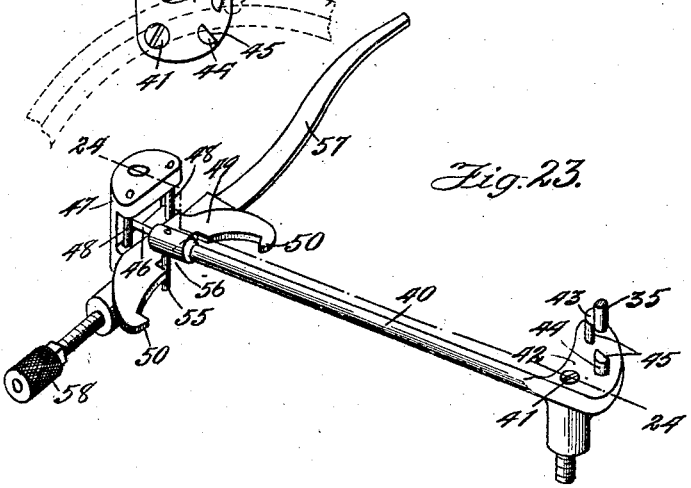
Fig. 23.
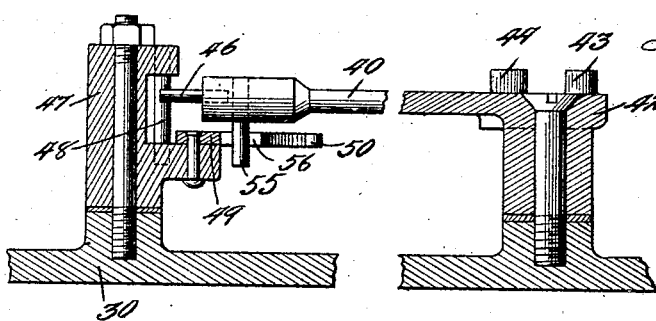
Fig. 24.
Witnesses:
Eva D. Perry
J. N. Jochum Jr.
Inventor:
G. P. Leonard
by Brown & Hopkins
Attys

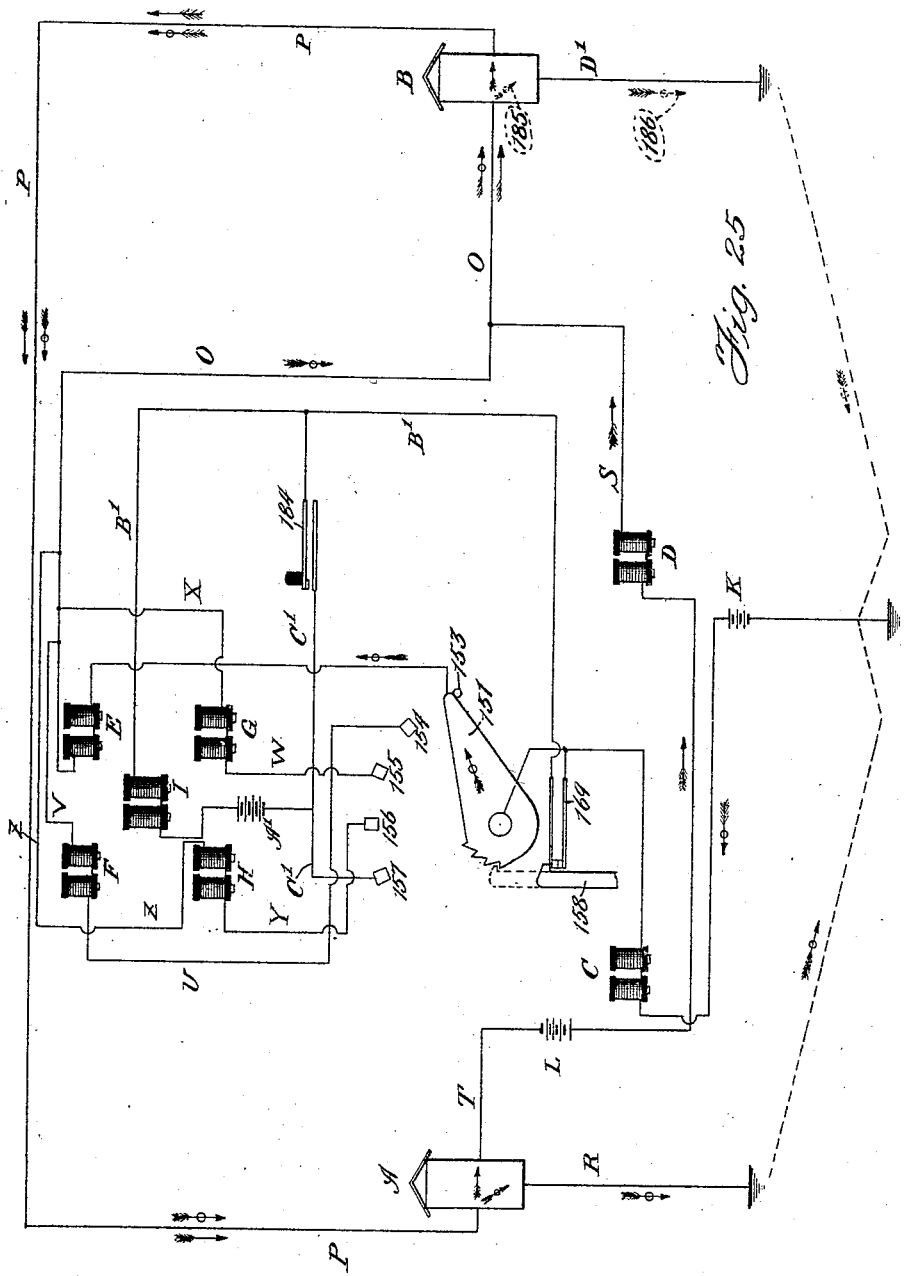

UNITED STATES PATENT OFFICE.

GUSTAF P. LEONARD, OF ELKHART, INDIANA.

FIRE-ALARM.

No. 908,585.      Specification of Letters Patent.      Patented Jan. 5, 1909.

Application filed March 22, 1907. Serial No. 363,826.

*To all whom it may concern:*

Be it known that I, GUSTAF P. LEONARD, a citizen of the United States, residing at Elkhart, in the county of Elkhart and State of Indiana, have invented certain new and useful Improvements in Fire-Alarms, of which the following is a specification.

This invention relates to improvements in fire alarms and the primary object of the invention is to provide improved means for rendering a visual and an audible signal.

A further object is to provide improved means whereby the audible signal may be placed out of operative position for the purpose of sending a "still alarm".

A further object is to provide improved means for producing a record of the alarm.

A further object is to provide an improved construction of indicator for the visual alarm and improved means for releasing said indicator.

A further object is to provide improved means for designating the nature of the alarm sent.

A further object is to provide an improved device of this character which will be simple and cheap in construction and efficient and effective in operation.

To the attainment of these ends and the accomplishment of other new and useful objects, as will appear, the invention consists in the features of novelty in the construction, combination and arrangement of the several parts hereinafter more fully described and claimed, and shown in the accompanying drawings illustrating an exemplification of the invention and in which—

Figure 1:
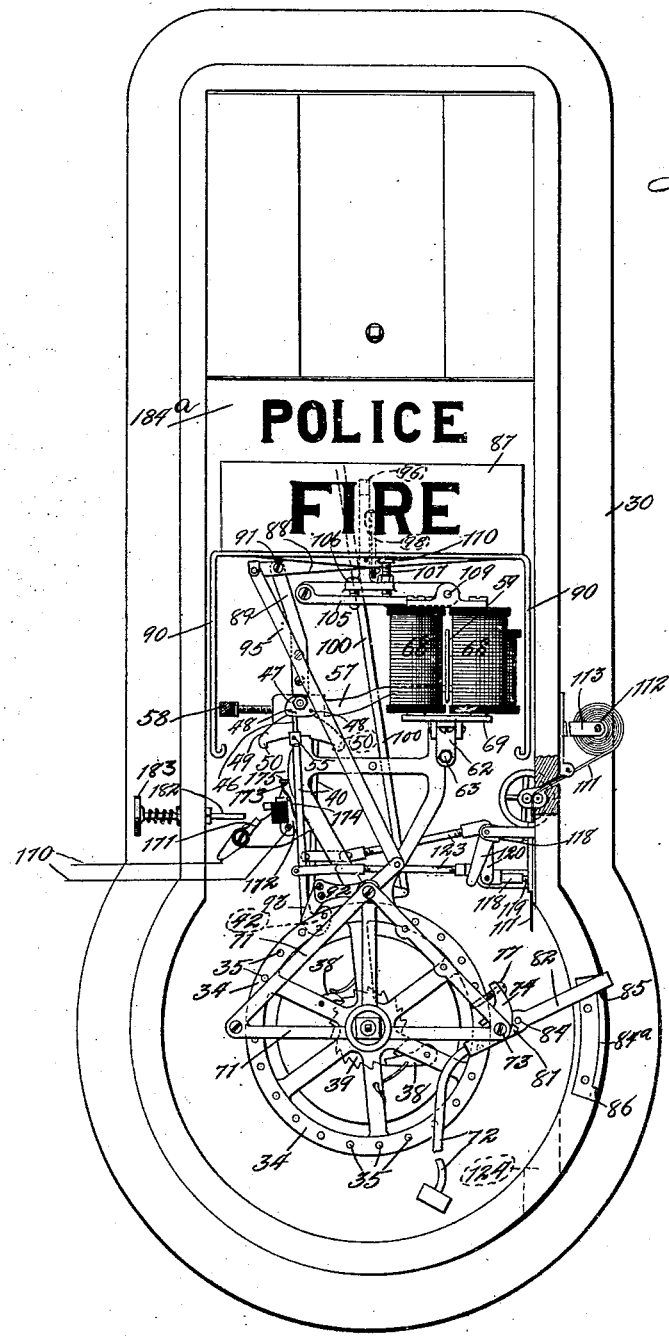
Figures 9, 10:
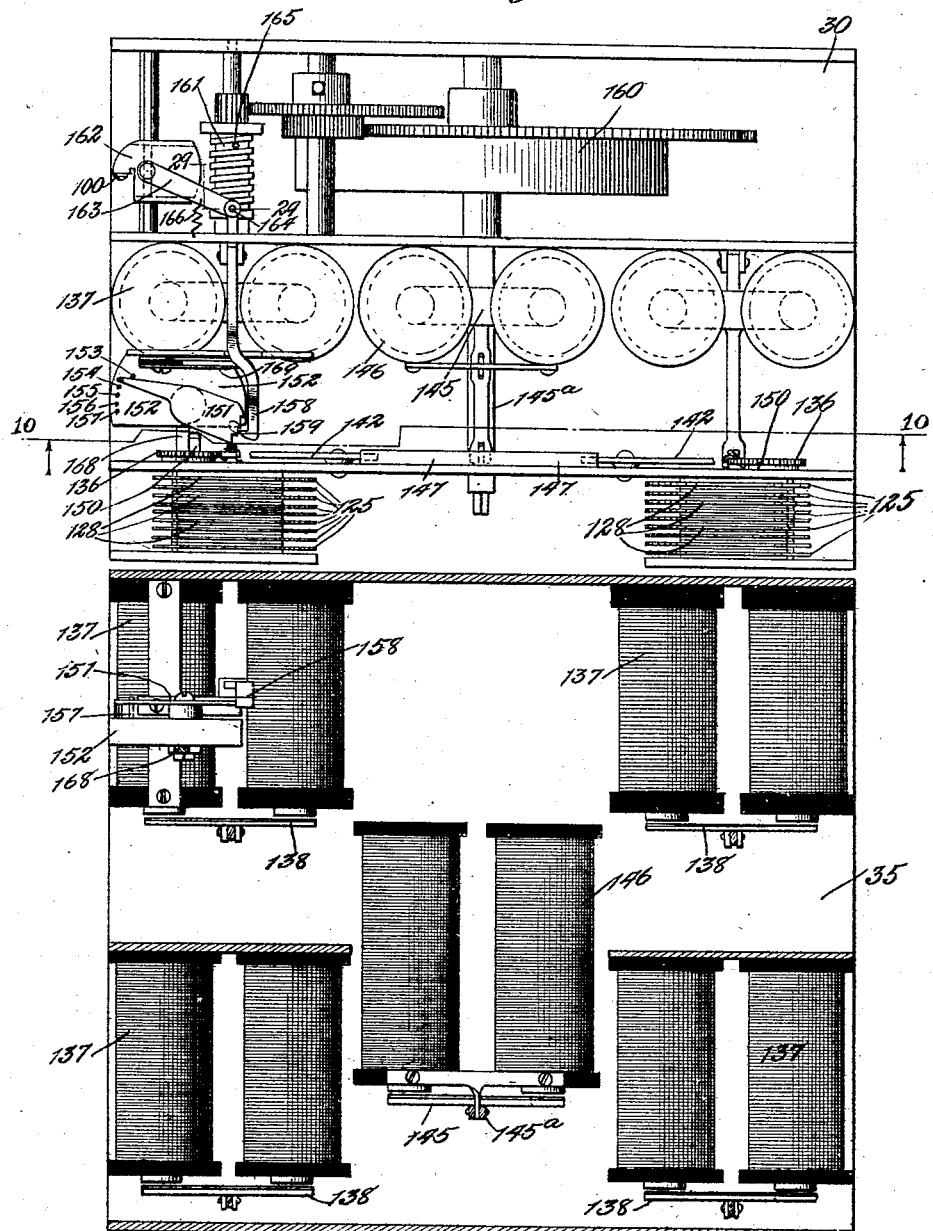

Figure 1 is a front elevation of the improved apparatus for producing the alarm, with the front of the casing removed. Fig. 2 is an enlarged detail view of Fig. 1. Fig. 3 is an enlarged detail view similar to Fig. 2, with the front portion of the apparatus removed. Fig. 4 is a sectional view on line 4—4 of Fig. 2. Fig. 5 is a sectional view on line 5—5 of Fig. 2. Fig. 6 is a front elevation of the visual indicator. Fig. 7 is a detail end elevation of the operating cams for raising the various indicators. Fig. 8 is a side elevation of Fig. 7. Fig. 9 is a top plan view of Fig. 6. Fig. 10 is a sectional view on line 10—10 of Fig. 9. Fig. 11 is a left-hand end elevation of Fig. 9. Fig. 12 is a detail perspective view, partly broken away, of one of the segments or members for raising the individual indicators. Fig. 13 is a detail perspective view of the operating pawl for the cams shown in Figs. 7 and 8. Fig. 14 is an elevation, partly in section, of the motor and operating mechanism for shifting the controlling switch. Fig. 15 is a detail perspective view of the controlling switch, its support and the contact points. Fig. 16 is a detail perspective view of the support for a portion of the switch operating member. Fig. 17 is a detail view of the hammer for the audible signal and the means for operating the same. Fig. 18 is a sectional view on line 18—18 of Fig. 17. Fig. 19 is a view taken on line 19—19 of Fig. 17. Fig. 20 is an elevation of the handle or member for throwing the hammer out of operative position for the purpose of sending a "still alarm". Fig. 21 is a detail perspective view of the operating mechanism for the designating indicator. Fig. 22 is a detail elevation, partly in section, of the releasing mechanism for the operating motors of the alarms and the recording means. Fig. 23 is a detail perspective view of the releasing mechanism. Fig. 24 is a sectional view on line 24—24 of Fig. 23. Fig. 25 is a diagrammatic view of the circuits. Fig. 26 is a detail perspective view of the lock for securing the sign in position, which designates the nature of the alarm sent. Fig. 27 is a detail end elevation of the hammer for the gong. Fig. 28 is a detail sectional view on line 28—28 of Fig. 3. Fig. 29 is a detail sectional view on line 29—29 of Fig. 9. Fig. 30 is a detail elevation of one face of the member for controlling the arm or lever which governs the release member of the escapement, showing the dogs pivoted thereto.

Referring more particularly to the drawings, the same reference numerals designate similar parts throughout the several views.

In this exemplification of the invention the numeral 30 designates a suitable casing within which this improved apparatus is placed and said casing is provided with a removable front 31, which closes the upper portion thereof and the lower portion of the casing may be closed by a suitable gong or bell 32. Arranged within the casing 30, preferably the lower portion thereof, and supported by the rear wall, are suitable operating motors, such as spring motors 33 or the like. These motors are preferably arranged one in advance of the other and as the specific construction and the operating mechanism of each motor is the same, the detailed description of one will apply equally as well to the other. Each motor is provided with an escapement wheel 34, which is preferably provided with laterally projecting lugs or pins 35, which are suitably spaced from each other and arranged around the periphery of the escapement wheel or member 34. The shaft 36 of the front motor preferably projects beyond the front of the casing 30 and terminates in an angularly shaped extremity 37ª, by means of which the spring of the motor may be wound when desired and the shaft 36ª of the rear motor passes through the shaft 36 of the front motor and also extends beyond the front of the casing and terminates in an angular extremity 37 by means of which the spring of said motor may be wound independently of another motor, an ordinary pawl 38 and ratchet mechanism 39 being provided for each motor.

The front mechanism is provided with a release member or arm 40, which is pivotally supported adjacent one end, as at 41, to the casing 30 and said release member or arm is preferably provided with an enlarged portion 42, preferably adjacent its point of pivotal support 41 and laterally projecting from said enlarged portion are spaced lugs 43, 44, which are preferably provided with flattened faces 45 and said lugs 43, 44, are so arranged with relation to each other and to the laterally projecting lugs or pins 35 on the escapement wheel 34 that when the member or arm 40 is in its normal position to lock the escapement wheel 34 against rotation under the influence of the spring, the flattened face 45 of the lug 43 will stand within the path of movement of the pin or lug 35. When the release member or arm 40 is moved about its point of pivotal support 41 to cause the lug 43 to move out of the path of the movement of the pin or lug 35, the lug 44 will assume a position in the path of movement of the release pin 35, which latter will then advance to engage and be arrested by the lug 44 to permit the escapement wheel 34 to move a portion of one complete step of rotation and as the release member or arm 40 moves in the reverse direction the lug 44 will be moved out of the path of movement of the pin 35 which is in engagement therewith, to permit the said pin to pass between the lugs 43, 44 and permit the escapement wheel to move forward to complete the step of rotation. At the same time the lug 44 is being moved out of engagement with the pin 35, the lug 43 will be moved into the path of movement of the next advancing pin or lug 35 to check the escapement wheel.

The release arm or member 40 may be of any desired length suitable for the purpose, and its free extremity preferably terminates in a reduced portion 46. Pivotally mounted upon a suitable support, preferably the back of the casing 30 is a member 47 for checking or controlling the release member or arm 40, and said member 47 is located adjacent the extremity of the release member or arm 40 and is provided with spaced projections 48 between which the reduced portion 46 of the release member or arm 40 is adapted to move and said checking or controlling member 47, together with the spaced projections 48, is so located with relation to the point of pivotal support 41 of the release member or arm 40 that during the operative movement of the latter, the reduced portion 46 will alternately engage one of the projections 48. The member 47 is preferably enlarged as at 49 and is provided with spaced lips or ears 50, which are adapted to be alternately engaged by a laterally projecting pin or lug 55 located on the adjacent portion of the release member or arm 40 and said enlarged portion 49 is also preferably provided with a recessed portion 56 into which the pin or lug 55 is adapted to enter when the checking or controlling member 47 is in its normal position and said pin or lug 55 is so arranged as to engage one edge of the recess 56 as the reduced portion 46 engages one of the spaced projections 48.

Projecting from the checking or controlling member 47 is an arm or lever 57 and a suitable counterbalancing member 58. The arm or lever 57 is adapted to move in a guide 59 which is suitably supported preferably near the free extremity thereof, shown more clearly in Figs. 2, 3, 5 and 22. A slotted member 60 is pivotally mounted as at 61 to a suitable support and in close proximity to the guide 59 and said member 60 is so arranged with relation to the guide 59 that the slot therein will register with a slot in the guide 59. The extremity of the arm or lever 57 also projects into the slot in said member 60, as shown more clearly in Figs. 3, 5 and 22. The member 60 preferably projects below its point of pivotal support 61, as at 62, and passing through said projection 62 is an adjusting or limiting screw 63 which is adapted to regulate the movement of the member 60. A dog or pawl 64 is pivoted to the member 60 in such a manner that the portion 65 thereof will project partially across the slot in said member and said extremity 64 is so located as to be engaged by and support the extremity of the arm or lever 57 to hold the flattened face 45 of the lug 44 on the extremity of the release member or cam 40 in the path of movement of one of the pins or lugs 35 on the escapement wheel 34 when the member 60 is moved about its point of pivotal support 61 in a position to cause the extremity 65 of the dog or pawl 64 to assume a position in the path of movement of the extremity of said arm or lever 57. A similar dog or pawl 66 is also pivotally supported by the member 60 and is preferably so arranged as to extend partially across the slot in said member and from the opposite side thereof. This dog or pawl 66 is preferably located above the dog or pawl 64 and serves to limit the upward movement of the extremity of the arm or lever 57 when the member 60 is rocked about its point of pivotal support 61 to move the dog or pawl 64 out of engagement with said extremity and to permit the release member or arm 40 to be moved about its point of pivotal support 41 to cause the lug 43 to assume a position in the path of movement of one of the pins or lugs 35. If desired, the slot in the guide 59 may be reduced as at 67, shown more clearly in Fig. 5 of the drawing, to prevent the extremity of the arm or lever 57 from springing away and to direct said extremity to a position to insure its engagement with the dog or pawl 66 when the latter is in operative position.

Any suitable means may be provided for moving the member 60 about its point of pivotal support 61. A suitable and efficient means for accomplishing this purpose comprises an electro responsive device such as a magnetic coil 68 or the like, and an armature 69 which preferably forms a portion of the member 60, and as the member 60 is oscillated by means of the armature 69 being alternately attracted by and released from the magnet 68, the pawls or dogs 64, 66, will be alternately moved into and out of the respective path of movement of the extremity of the arm or lever 57 to control the movement of the checking member 47, which in turn controls the movement of the escapement wheel 34.

The motor which is located adjacent the front of the casing is for the purpose of sounding the audible signal or striking the gong 32 and the said motors are preferably spaced from each other by means of a suitable frame 70, shown more clearly in Fig. 5 of the drawings, and arranged adjacent the gong or bell 32 is another suitable supporting frame 71, to which latter frame a hammer 72 is pivotally supported preferably by one extremity, as at 73, shown more clearly in Figs. 1, 2, and 5 of the drawings. This hammer 72 is preferably provided with a projecting ear 74 and pivotally supported by said ear is a bail 75. A yielding member 76, such as a spring or the like, is secured preferably to the supporting frame 71, shown more clearly in Fig. 5 of the drawings, and one extremity of said member is preferably seated within and connected to the hammer 72 by means of the bail 75, and said member 76 serves as the means for forcing the hammer 72 to strike the gong or bell 32. Any suitable means may be provided for adjusting the tension of said yielding member 76 with relation to the hammer 72 and a suitable and efficient means for accomplishing this purpose comprises an adjusting screw or bolt 77 which preferably extends through the ear 74 and engages said member adjacent the bail 75. If desired, a suitable lug or bolt 78 may also be provided which is preferably secured to the supporting frame 71 in such a manner as to engage and rest against the yielding member 76 to brace said member and increase its rigidity.

The hammer 72 is preferably provided with a hub 79 which is located preferably adjacent the periphery of the escapement wheel 34 and said hub 79 is provided with a cam-shaped portion 80 and said hub is of such a length that when the hammer 72 is in position, the cam-shaped portion 80 will be located on the opposite side of the escapement wheel 34 and will stand a sufficient distance from the hub that when the escapement wheel 34 is rotated, the pins or lugs 35 will engage the cam-shaped portion 80 to rock the hammer 72 about its point of pivotal support 73 to carry the hammer into such a position that when the engaging pin or lug 35 is moved into a position to release the cam-shaped portion 80, the yielding member 76 will throw the hammer 72 forcibly against the gong or bell 32 to strike the latter. The hammer is also provided with an ear or projection 81, located at any convenient point. A handle or lever 82 is pivotally supported preferably by means of a hub 83, which is journaled adjacent the hub 79 and said handle or lever 82 is provided with a lateral projection 84 which is adapted to engage the ear or projection 81. The hammer 72 when in an operative position is adapted to be intermittently moved by means of the respective pins or lugs 35 and the handle 82 is adapted to be secured into such a position as to permit the movement of the hammer 72 under the influence of the pins or lugs 35. Any suitable means may be provided for securing the handle or lever 82 in an inoperative position. A suitable and efficient means for accomplishing this purpose comprises a member 84ª provided with shoulders 85, 86. The extremity of the handle 82 preferably projects through the casing 30 and the shoulders 85, 86 are so disposed that when the extremity of the handle 82 is in the position as shown in Fig. 17 of the drawings, that is, engaging the shoulder 85, the lateral projection 84 thereon will be locked out of engagement with the ear or projection 81 to permit the free operation of the hammer 72, but when the handle is shifted to engage the shoulder 86, the projection 84 will engage the ear or projection 81 to rock the hammer about its point of pivotal support, and the coöperating parts will be moved out of the path of movement of the pins or lugs 35 which will permit the escapement wheel 34 to rotate without imparting motion to the hammer 72. The hammer is adapted to be moved or shifted to this point when it is desired to send or receive a "still alarm."

Any suitable and efficient means may be provided for displaying the nature of the audible alarm received by the apparatus, such, for instance, as a fire alarm. A suitable and efficient means for imparting this information comprises a sign 87 which is adapted to be moved so as to be displayed through a suitable opening preferably in the upper portion of the front of the casing and said sign is preferably pivoted to one extremity of an arm 88, which latter is also preferably pivoted to a suitable support 89. The sign 87 may also be provided with depending arms or projections 90 which serve to counterbalance this sign and act as guides for maintaining the sign in a proper position. The arm 88 is of such a length that when moved about its point of pivotal support 91, the sign 87 will be raised.

Any suitable and efficient means may be employed for raising the sign, but a simple and efficient means comprises a pivotally supported member 92, which is preferably located adjacent and above the periphery of the escapement wheel 34, as shown more clearly in Figs. 1, 2, 5 and 21, and said member 92 is provided with a depending portion 93, which normally stands within the path of movement of the pins or lugs 35 on the escapement wheel so that when the escapement 34 moves one step of rotation one of the pins 35 will engage the adjacent extremity of the depending portion 93 to rock the member 92 about its point of pivotal support. The member 92 is also preferably provided with a projecting arm 94, which is located preferably substantially diametrically opposite to the depending portion 93 and said arm 94 is connected to the arm 88 by means of a suitable link or connection 95 so that when the member 92 is rocked about its pivot, the link or connection 95 will move the extremity of the arm 88 which is connected to the sign 87 to such an extent as to cause the sign to be displayed through the opening in the casing.

The sign 87 will be moved into view by the first pin or projection 35, which engages the depending portion 93 of the member 92, that is, the sign will be displayed by one step of rotation of the escapement wheel and after having been thus adjusted, it is held in its adjusted position until released in the manner to be set forth. A suitable and efficient means for locking or holding the sign in an exposed position preferably comprises a stop 96, which extends into the path of movement of the arm 88 and is adapted to be engaged by said arm when said arm has substantially reached the limit of its movement. A dog 97, preferably spring controlled, is pivotally supported adjacent the stop 96 and the extremity 98 of the dog is adapted to normally project into the path of movement of the arm 88 so that when the arm 88 is raised, said extremity 98 will be engaged by and moved out of the path of movement of the arm 88 to permit said arm to continue in its movement until it strikes the stop 96 at which time the dog 97 will assume its normal position causing its extremity 98 to move into the path of the return movement of the arm so that the arm will be locked into position and supported by the extremity 98 of the dog 97, which will also hold the depending portion 93 of the member 92 out of the path of movement of the pins or lugs 35 on the escapement wheel 34. The dog 97 is preferably provided with an extension or arm 99 by means of which it may be rocked about its point of pivotal support to release the sign 87 and when so released, the sign will move into a concealed position by means of the gravity thereof together with the gravity of its operating parts.

A suitable and efficient means for rocking the dog 97 to release the sign comprises an operating bar or member 100, one end of which is preferably pivotally connected to a member 101, which is pivotally supported by means of a suitable frame 102 and said member 101 is located preferably above and adjacent the escapement wheel 34 of the rear motor. Said member 101 is provided with a downwardly projecting ear or portion 103 which is adapted to assume a position in the path of movement of the lugs or pins 35 so that as the escapement advances one step of rotation, the projection 103 will be engaged and raised, thereby rocking the member 101 to draw the bar or member downward. This bar or member 100 is provided with a projection or shoulder 104 which is located adjacent and slightly above the projecting portion 99 of the dog 97 so that when the bar or member 100 is drawn downward, the projection or shoulder will engage the extension 99 and rock the dog 97 to move the extremity 98 out of engagement with the arm 88.

It will be apparent that although the hammer 72 is adjusted to an inoperative position for a still alarm, the front device will be operated just the same to display the sign 87 when a fire alarm is sent in and the number of the box may then be obtained from the visual signal of the rear device.

The rear motor controls the visual signal and is operated in the same manner as the front motor which operates the audible signal and both of said motors are released or controlled by the electro-responsive devices 68. The circuit being first completed through the magnets 68 of the rear motor will start said motor to operate and by the time the rear motor stops the circuit through the magnet of the front motor will be controlled in the manner to be set forth, which will set the front motor in operation. The magnets 68 may be supported in any suitable manner and if desired they may be supported by means of a pivoted arm 105 which may be adjustably held in position by means of a screw or bolt 106 so as to adjust the magnets or to accommodate magnets of different sizes and may be held in their adjusted position by means of suitable stop screws or bolts 107 provided with the ordinary jam nut 108. The magnets may also be supported for rotative adjustment with relation to the arm 105 by means of an axle 109, which is journaled in one extremity of the arm and which is secured to the magnets and said axle may be secured against rotation by means of a suitable screw or bolt 110.

If desired, suitable means may be provided for securing a record of the alarms received. A suitable and efficient means comprises a tape or strip 111 wound upon a suitable spool 112 and said spool is supported in any suitable manner such as by means of brackets 113 preferably on the exterior of the casing 30. The tape or strip 111 is adapted to pass through a suitable slot or aperture 114 in the casing between suitable guide rollers 115 and between guide plates 116 preferably located on the inside of the casing. These guide plates 116 are preferably provided with registering apertures 117. Pivotally supported adjacent the apertures is a guide 118 through which passes a perforating pin or needle 119 and an arm 120 is preferably pivoted between its extremities to a suitable support 121 and one extremity thereof is pivotally connected to the perforated pin or needle 119 so that when the free end of the arm 120 is moved about its point of pivotal support, the extremity of the perforating pin or needle 119 will be first moved out of engagement with the strip 111 and a continued movement of the arm 120 in the same direction will rock the guide 118 on its pivot so as to advance the pin or needle 119 toward the supply end of the strip 111 and when the arm 120 is moved in the opposite direction, the point of the pin will perforate the strip and will remain in contact therewith during the movement of the guide 118 about its pivot to feed the strip 111. The arm 120 may be operated in any desired or suitable manner but a simple and efficient means for accomplishing this purpose comprises a link 123, one end of which is pivotally connected to the free end of the arm and the other end has a pivotal connection with the release member or arm 40 so that when the latter is moved about its point of pivotal support, movement will be transmitted to the perforating pin or needle 119. The free end of the strip 111 may pass out of the casing through a suitable slot 124, as shown more clearly in Fig. 1 of the drawings.

The visual signal is located in the upper portion of the casing 30 and comprises a series of independent numbers or characters arranged in separate groups and each of said groups is provided with an independent operating mechanism, that is, with independent means for controlling or moving the respective numbers into view. The operating mechanism of all of said groups being of the same construction, the detailed description of one group will apply equally as well to the others. Each group preferably comprises a series of nine members 125 mounted for independent pivotal movement about a support 126. (See Fig. 6). These members are each provided with a series of teeth 127 disposed around the point of pivotal support 126. The normal position of these members 125 is to conceal said members and when moved about their points of pivotal support 126 the respective members will be moved into view. Any suitable means may be provided for moving these members 125 and a simple and efficient means for accomplishing this purpose comprises a pivotally supported segment 128, which is provided with a series of teeth 129 adapted to mesh with the teeth 127 on the members 125 and when the segments are rocked about their point of pivotal support 130, the members 125 will be moved about their points of pivotal support through the medium of the interengaging teeth 127, 129. Each segment 128 is preferably of a composite construction comprising the segment 128 proper, to each side of which is secured plates 131 which are preferably of a somewhat larger construction than the segment so as to form a space beyond the periphery of the segment and between the plates 131. The members 125 are so spaced from each other that when the teeth 129 of the respective segment are in engagement with the teeth 127 of the member 125, the plates 131 will stand between or project into the spaces between the portions of the members 125 adjacent the pivot 126 and serve as means for guiding the segments and for preventing displacement thereof.

The segments 128 are successively moved about their points of pivotal support 130 in any suitable manner, preferably by means of a cylindrical member 132 rotatably supported adjacent the segments and said cylindrical member is provided with a plurality of spaced peripheral cams 133 and said cams are so arranged with relation to the adjacent extremity of the segments 128 that one cam will be in proximity to each segment. The numbers on the members 125 are preferably arranged so as to progress from 1 to 9 in a direction from the rear toward the front of the casing and the cams 133 on the cylindrical member 132 are so arranged with relation to the segments and are so constructed that during the first step of said cylindrical member, the cam adjacent the number 1 will move said number into view. A further rotation of the cylindrical member in the same direction will cause the second cam, or the cam adjacent the member bearing the number 2, to move said member into view and so on causing the numbers to be exposed according to their direction of progression; the cam 133 adjacent the numeral 1 being larger or of greater circumference than the cam adjacent the numeral 9. The members 125 having been once moved into position to expose the respective number thereon, will be held in position by the cams until released in the manner to be set forth, which will permit all of said members which have been exposed to return to their normal or concealed position. A portion of the periphery of the cylindrical member 132 is free from a cam-shaped projection, as at 134, shown more clearly in Figs. 6 and 7 of the drawings, and extends substantially the entire length of the cylindrical member 132, and when said portion 134 is adjacent the extremities of the segments 128, said segments will assume a normal position to permit the members 125 to be returned or concealed. A suitable spring 135 may be provided for each of the segments 128 to cause them to return to their normal position and said spring preferably rests within the space formed between the plates 132 of the segment.

The cylindrical member 132 is preferably provided with a toothed or ratchet wheel 136, which is secured to one extremity of the axle thereof by means of which said member may be intermittently rotated. Any means may be employed for imparting motion to the member 132 and a suitable and efficient means for accomplishing this purpose comprises an electro-responsive device such as a magnet or the like, and an armature 138, which is adapted to be controlled by the magnet when the latter is energized. A bar or member 139 is operatively connected to the armature 138 and pivotally supported by the free end of said bar or member 139 is a yielding dog 140, which is provided with a projecting portion 141 adapted to engage the bar or member 139 to limit the movement of said dog in one direction and to permit its free movement in the other direction. The extremity of said dog or member is adapted to stand in close proximity to the teeth or ratchet wheel 136 so that when the magnet 137 is energized and the armature 138 is attracted thereby, the dog 140 will be brought into engagement with one of the teeth 136 and a continued movement of said arm 139 in the same direction will advance or rotate the cylindrical member 132 one step of rotation and when the magnet 137 is deënergized the armature 138 will return to its normal position and the dog 140 will move about its point of pivotal support to permit the same to pass the next tooth 136 to assume a position to engage said tooth to move the cylindrical member 132 another step of rotation when the bar or member 139 is again moved by the attraction of the armature 138. A suitably pivoted dog 142 is adapted to be moved into engagement with the teeth 136 as the cylindrical member 132 is rotated by means of a spring 143 to prevent a retrograde movement of the cylindrical member as the dog 140 is returned to its normal position.

The various groups of members 125 are operated independently of each other and successively, that is, the members designating the first number or digit of the alarm received will be first displayed and held in position in the manner already described, after which the numbers or digits indicating the second numeral of the alarm will be displayed and so on until all of the numbers or the complete number of the box from which the alarm has been turned in has been displayed. The pawls or dogs 142 of all of the groups may be simultaneously released in any desired or suitable manner. A simple and efficient means comprises a bar or member 144, which is suitably supported and connected to an armature 145 through the medium of a pivoted arm 145$^a$, the armature being controlled by a suitable electro-responsive device 146 which operates independently of the electro responsive devices, 137. The bar or member 144 is provided with projecting portions 147 so arranged that one of said projections will be located in close proximity to a projecting portion 148 on each of the retaining dogs or pawls 142 so that when the armature 145 is attracted by the magnet 146, the arm 145$^a$ will be rocked to move the bar or member 144 in a direction to rock the dogs or retaining pawls 142 about their points of pivotal support so as to move the extremities thereof out of engagement with the teeth 136 of the ratchet wheel on the cylindrical member 132. When thus released, the cylindrical members 132 may be returned to their normal position in any desired or suitable manner preferably by means of a spring 149, one end of which is secured to a suitable support and the other end to an arm 150.

The numbers in the groups are successively displayed and referring to Fig. 6 of the drawings, the numbers in the group in the upper left hand corner will be first displayed and then the numbers in the upper right hand group will next be displayed followed by the numbers in the lower left hand group, and finally the numbers in the lower right hand group, the current being completed through the electro responsive device in the upper left hand corner of Fig. 10 from where it is switched to the electro responsive device in the upper right hand corner of said figure, then to the electro responsive device in the lower left hand corner and then to the electro responsive device in the lower right hand corner and finally to the release electro responsive device located in the middle of the figure.

Any means may be provided for completing the currents through the various electro responsive devices and a simple and efficient means for accomplishing this purpose comprises a switch 151, which is rotatively mounted upon a suitable support 152 and secured to said support 152 are a series of contact points 153, 154, 155, 156 and 157. These contact points are connected respectively to the electro responsive devices of the various groups of numbers and also to the electro responsive releasing device. The switch 151 is adapted to be moved across or successively in contact with these contact points.

Any suitable means may be provided for operating the switch. A suitable and efficient means for accomplishing this purpose comprises a hooked arm or member 158 which is suitably supported in such a position that the hooked-shaped portion thereof will engage one of a series of teeth 159 on the switch 151 each time the arm 158 makes a complete movement and move said switch one step so as to engage the next contact to send the current through the next electro responsive device to energize the same. Any means may be provided for moving the arm 158. A suitable and efficient means for accomplishing this purpose comprises a spring motor 160, which is geared up to a suitable worm-screw 161. A member 162 is pivotally supported preferably adjacent the worm-screw 161, and to said member 162 is connected one extremity of the rod or bar 100, as shown more clearly in Figs. 9, 14 and 16. Said member 162 serves as a support for a laterally movable arm 163 which is also pivoted to the member. The free extremity of the arm is pivotally connected to the hooked-arm 158 and depending from said arm 163 preferably at the point of connection with the arm 158 is a pin 164, which is adapted to stand within the space between the threads of the screw 161 and said screw 161 tends to move the arm 163 through the medium of the pin 164 so as to cause the hooked-arm 158 to engage one of the teeth 159 of the switch 151 to move the latter. A suitable projecting pin 165 may be provided at a suitable point within the length of the screw 161 to be engaged by the pin 164 to stop the advancement of the pin 164 by the thread of the screw, to stop and lock the motor. A spring 166 is provided for holding the pin 164 at the front end of the screw 161 so as to hold the arm 158 in a position to engage one of the teeth 159. As soon as the current is completed through the rear apparatus and its motor is released to operate the apparatus, the bar or rod 100 will be vibrated as the escapement 34 rotates in the manner as already set forth and during the vibratory movement of the bar 100, the pin 164 will first be raised from its normal position in contact with the pin 165 to release the motor 160, and moved to the front end of the screw by the spring 166 and lowered into engagement with the threads of the screw after which it will be alternately raised and lowered so as to be intermittently moved out of engagement with the threads of the screw 161 to prevent said screw from feeding the pin 164 towards its opposite end, which would shift the switch, but as soon as the escapement wheel 34 has stopped rotating the bar or rod 100 will be held still and the screw 161 will feed the pin 164 towards its opposite end, which will raise the arm 158 to shift the switch 151. During this portion of the operation the current will be traveling through the electro responsive device of the first group. When the switch is thus shifted and is in engagement with the contact 154, the current will be shifted from the first electro responsive device to the second and as the switch moves from one to the other of the contacts, the current will travel through the successive devices until the switch is in engagement with the contact 157, which will place the parts in a position to send the current through the release electro responsive device and when the end of the arm 158 reaches the limit of its movement, it will engage a suitable switch 169, shown more clearly in Fig. 9, and the diagrammatic Fig. 25, to complete the circuit through said release device.

The arm 158 closes the switch 169 each time it makes a complete movement but has no effect upon the current until the switch 151 is in engagement with the contact 157 and when the switch 169 is then closed the current will flow through said device. The current flowing through said device will release the cylindrical members 132 in the manner already set forth, so that the springs 149 will cause the arms 150 of all of the cylindrical members 132, except the cylindrical member which controls the operation of the numbers in the first group, to engage the respective stops 167. The switch 151 is provided with an arm 168 which moves with the switch and during the movement of the switch 151 said arm 168 is moved into a position to be engaged by the arm 150 on the cylindrical member 132 on the first group and when the arm 150 engages the arm 168, it will move the switch 151 back to its normal position or in engagement with the contact point 153.

Any suitable means may be provided for sending an alarm or signal to a point remote from the apparatus when an alarm is turned in and the apparatus begins to work. This may be accomplished by means of a separate circuit designated generally by the reference numeral 170, shown more clearly in Figs. 1, 2, and 3 of the drawings. A suitable switch may be arranged within the casing and supported in any suitable manner for controlling or closing the circuit 170. This switch preferably comprises stationary contact point 171 and a pivotally supported spring controlled member 172. This member 172 is preferably provided with a yielding dog 173 and said member 172 is adapted to be normally locked or held out of engagement with the contact 171 and suitable means may be provided for automatically releasing the member 172 to permit the spring 174 to move the member into engagement with the contact 171 to close the circuit.

A suitable and efficient means for locking and releasing the member 172 preferably comprises a pivoted member 175 and said member is provided with a bifurcated portion 176 into which the release member or arm 40 is adapted to stand and the bifurcated portion 176 is so located with relation to the release member or arm 40 that when the latter is moved about its point of pivotal support 41, the member 175 will also be moved about its point of pivotal support 177. This member 175 is also provided with a hook-shaped portion 178 and an overhanging or projecting lip 179 to produce a slot 180, which has an opening 181 between the extremity of the hook-shaped portion 178 and the over-hanging lip or portion 179 and said slot is so positioned with relation to the yielding dog 173 that when the member 172 is out of engagement with the member 175 and is moved about its point of pivotal support the extremity of the dog 173 will engage the outer face of the hook-shaped portion 178, which latter will move the dog about its point of pivotal support and as the member 172 is moved further in the same direction, said dog will pass out of engagement with the hook-shaped portion 178 and spring into the slot 180 which will lock the member 172 in the position shown more clearly in Fig. 3 of the drawings to break the circuit 170.

When the motor which controls the releasing member or arm 40 starts to operate, the latter will also be operated and will rock the member 175 about its point of pivotal support. The normal tendency of the spring 174 is to cause the member 172 to move towards the contact 171. As the member 175 is rocked by the vibration of the release member or arm 40 the dog 173 will remain in engagement with the inner face of the hook-shaped portion 178 until the tip or nose of said hook-shaped portion passes out of engagement with the dog. The dog being thus released, the member 172 will be thrown in the direction towards the contact 171 so that the dog will engage the inner face of the overhanging lip or projection 179 and will remain in contact with said face during the movement of the member 175 in the opposite direction and until the extremity of the overhanging lip or portion 179 passes out of engagement with the dog. The member 172, being thus released, will move under the influence of the spring 174 into engagement with the contact 171 to complete the circuit and said circuit will remain completed until the member 172 is moved out of engagement with the contact 171 and as the switch is located within the apparatus and at a point remote from the place where the signal is placed, the current cannot be broken except at the apparatus.

Any suitable means may be provided for breaking the circuit or moving the member 172 out of engagement with the contact 171. A suitable and efficient means for accomplishing this purpose comprises a spring controlled rod 182 which extends into the casing 30 and said rod is preferably provided with a button 183 on the outside of the casing, so that when the button 183 is pressed, the extremity of the rod 182 will engage and move the member 172 about its point of pivotal support to cause it to be locked out of engagement with the contact 171 in the manner already set forth. Within the casing 30 is a stationary sign 184ᵃ which is displayed through the front thereof when the sign 87 is lowered as shown in Fig. 1, so that when the audible signal is not operated this sign will be always displayed, but when the audible signal is operated, the sign 87 will be moved to a position to be displayed and to cover the sign 184ᵃ.

The circuits of the various electro responsive devices will now be described and for this purpose reference may be had to the diagrammatic illustration shown in Fig. 25 of the drawings. In this diagrammatic illustration, the reference characters A and B represent street boxes from which the alarm may be turned in, C designates the electro responsive device which controls the rear apparatus for displaying the individual numbers and D designates the electro responsive device for controlling the front apparatus for operating the gong or audible signal. The letters E, F, G and H designate respectively the electro responsive devices for successively controlling the visual signals or the members 125, and I designates the electro responsive device for controlling the releasing mechanism for the members 125. In this exemplification of the invention, the electro responsive device C, which controls the rear apparatus for operating the visual signal, is preferably placed upon a grounded or normally open circuit and is arranged to respond more quickly than the front device to start the rear apparatus in advance of the front apparatus. The battery K is arranged in the grounded circuit and the battery L is arranged in the metallic circuit and by placing these batteries in such a position as to be between the boxes and the responsive apparatus and by wiring according to this exemplification of the invention it is possible to send two currents through the same lines for a short distance. Both of the devices are set in motion by the circuit controllers in the street boxes in the usual manner and the rear device is arranged to act more rapidly than the front device.

When a police call is sent in from the call box, the circuit controlling the rear device only is used and the "Police" sign will be exposed. When a fire alarm is sent in from the call box both of the devices will be operated, the rear device acting in advance of the front device, that is, the rear device will substantially complete its operation before the front device begins to operate. The operation of the front device will cause the sign 87 to be exposed to designate the nature of the alarm and the "Police" sign will be concealed. This result is accomplished by means of the rear device being arranged to operate or respond and substantially complete its operation before the front device begins to operate.

With this improved arrangement and by placing the gong on the metallic circuit which is always closed, the gong will always be sounded once should the wire break. Furthermore, by the use of a separate circuit for operating the visual signal, the latter will not be hampered by the operation of the hammer and more speed can be obtained to expose the visual signal.

The circuits are controlled by means of circuit breakers within the various street boxes and said circuit breakers are so arranged that the ground circuit is normally open at that point while the metallic circuit is closed. These circuit breakers form no part of the present invention and are of the ordinary and well known construction as used in devices of this character. In tracing these circuits, the ground circuit will be indicated in the diagram as follows ⇢-○-⇢, while the metallic circuit will be indicated by a plain arrow.

Assuming the metallic circuit to be closed and the ground circuit open and the switch 151 in a position to engage the contact 153 and it is desired to turn in an alarm from the box A, the circuits will be as follows; the first operation of the circuit controllers will be to close the ground circuit. The ground circuit being thus closed, the direction of the current will be as follows:—from the battery K through the conductor to the rear electro responsive device C, through the conductor to the switch 151, contact point 153, through the conductor to the electro responsive device E which controls the members 125 of the first group or the group located in the upper left hand corner of Fig. 6; from the electro responsive device E, through the conductor O to the box B, through the box B to the conductor P, the conductor O and P being normally closed; through the conductor P back to the box A, through the box A to the conductor R, and from the conductor R through the ground back to the battery K. This circuit will be traveled by the current each time the circuit controller closes the ground circuit, said circuit being alternately opened and closed according to the circuit controller in the ordinary and well known manner, the opening and closing of this circuit causing intermittent pulsations in the electro responsive device E which will operate or move the armature 138 coöperating therewith and said armature, through the medium of the rod 139, will operate the cylindrical member 132 to display the desired number. At the same time that the ground circuit is traveling in the course just indicated, the circuit controller for the metallic circuit will be brought into operative position. This controller is also of the ordinary and well known construction and so arranged as to intermittently open the metallic circuit and to permit the same to be closed, and these circuit controllers are arranged to operate alternately, that is, when one is in an operative position the other is out of operative position. The current through the metallic circuit will take the following course:—from the battery L through the conductor to the electro responsive device D which controls the front apparatus through the conductor S to the conductor O, through said conductor O and through the box B to the conductor P which conductors O and P are normally closed following the conductor P to the box A, through the circuit controller in the box and out through the conductor T back to the battery L. The intermittent pulsations thus caused in the electro responsive device D will operate the motor which controls the audible alarm.

When the controller for the ground circuit is operated in the ordinary and well known manner to designate the first digit in the number of the box or the alarm, the motor 160, shown more clearly in Figs. 9 and 14 of the drawings, through the medium of the worm screw 161, will operate the arm 158 in the manner already described, causing the arm 158 to shift the switch 151 from the contact point 153 and into engagement with the contact 154 so as to switch the current from the electro responsive device E to the second electro responsive device F, which latter controls the second group of figures or the group at the upper right hand corner of Fig. 6. The various currents will travel in the course just indicated with the exception that from the switch 151 the current will take its course through the contact 154, through the conductor U to the electro responsive device F and from said electro responsive device F to the conductor O and back to the battery K in the manner as already described. After the desired number is exposed by the electro responsive device F, the switch 151 will be moved in a similar manner to the contact 155 causing the circuit to travel from the switch 151 through the conductor W to the electro responsive device G and from said electro responsive device back to the conductor O. In a similar manner, after the switch 151 has been moved into engagement with the contact 156, the circuit will flow from the contact 156 through the conductor Y, electro responsive device H, conductor Z to conductor O and back to the battery K, as already described.

The normally open switch 169 is closed each time the arm 158 makes a complete movement and after the last digit in the box number has been exposed by the current passing through the last electro responsive device H, the switch 151 will be shifted in the manner already described until it is in engagement with the contact 157. When the arm 158 closes the switch 169 after the switch 151 is in engagement with the contact 157, the circuit will pass through the electro responsive release device I in the following manner: from the battery $A^1$, which is located within the circuit of the release electro responsive device I, through said electro responsive device to the conductor $B^1$, through said conductor to the switch 169, through the switch 169 to the switch 151, through said switch 151, contact 157 and conductor $C^1$, back to the battery $A^1$, which will energize the electro responsive device I and cause the armature 145, which is controlled thereby, to operate the rod 144 and cause the arms 147 thereon to raise the dogs 142 out of engagement with the respective ratchet wheels 136 to release the cylindrical members 132 to permit the members 125 to assume their normal position.

A suitable cut-out or switch 184 may be arranged to control the electro responsive device I so as to cause said electro responsive device to release the members 125 of the various groups at any desired time, such, for instance, should it so happen that the number of the box from which the alarm is sent comprises less than four digits, that is, a number which does not comprise enough digits to send the current through all of the electro responsive devices. When this switch 184 is closed, the circuit will be as follows: from the battery $A^1$, through the electro responsive device I, through conductor $B^1$, through the switch 184 and through the conductor $C^1$, back to the battery $A^1$. In this diagrammatic illustration, the dotted arrows 185 and 186, designating the course of the ground current from the box B, are simply illustrated to show the direction of the ground current when the alarm is turned in from the box B and in this instance, of course, the ground circuit will not pass through the conductor R to the ground, as the circuit will be open at that point in the same manner as it will be open at the conductor $D^1$ when the alarm is turned in from the box A.

The respective pins 43, 44 on the release members or arms 40 are so located that in the normal position of said arms or members, the pin 43 on the front apparatus will normally stand within the path of movement of the pin 35 on the respective escapement 34, which will cause the reduced portion 46 of said member to engage the left hand stop or projection 48 while the pins on the enlarged portion 42 on the rear releasing member or arm 40 are so arranged that the pin 44 will normally stand in the path of movement of one of the projecting pins 35 on the respective escapement 34. The different positions of these two release members or arms 40 will cause the respective extremity of the arm or lever 57 to be in a different position, that is, the extremity of the arm or lever 57 of the front apparatus will be against the projecting portion 65 of the pawl 64 while the extremity of the rear arm or lever 57 will rest against the pawl 66, due to the fact that the electro responsive device 68 of the front apparatus is arranged in a normally closed metallic circuit, as shown more clearly in Fig. 5 of the drawings. When the armature 69 of the electro responsive device controlling the rear apparatus is first attracted, the member 60 will be rocked about its point of pivotal support to move the dog or pawl 66 out of engagement with the extremity of the lever 57 and the tension of the spring will move the escapement wheel 34 so as to rock the release arm or member 40 about its point of pivotal support to permit the pin 35 to pass the adjacent pin or lug 44. The extremity of the arm or lever 57 will then be moved upwardly by means of the pin or lug 55 engaging the enlarged portion 49 of the checking or controlling member 47 and said pin or lug 55 will move forwardly until it strikes the lip or ear 50, the free end of the arm or member 40 being released so that it will pass from between the spaced projections 48 as the arm 57 is rocked. When the arm 40 has reached the limit of its forward released movement, the pin 43 thereon will be moved into the path of movement of the next projecting lug or pin 35 on the escapement 34 and as the escapement advances it will rock the arm or member 40 back to its normal position, that is, back to a position so that its extremity will pass between and strike one of the lugs 48, which will rock the free extremity of the arm or lever 57 about its point of pivotal support to move the extremity of the arm or lever 57 into engagement with the portion 65 of the dog or pawl 64.

When the armature 69 is released, the member 60 will be further rocked about its point of pivotal support to move the extremity 65 of the dog or pawl 64 out of the path of the downward movement of the extremity of the arm or lever 57. A continued downward movement of such extremity will again release the extremity of the arm 40 to permit the pin 55 to engage the enlarged portion 49 of the checking or controlling member 47 to rock said member, and the pin will continue in its movement to the left to release or move the pin or lug 43 out of the path of movement of the pin or lug 35 on the escapement 34 and to move the pin or lug 44 into the path of movement of the next advancing pin or lug 35. The engagement of the pin or lug 35 with the pin or lug 44 will rock the member 40 back to its normal position and the movement of said member to its normal position will cause the extremity thereof to pass between the stops 48 and engage one of the stops to cause the extremity of the arm 57 to move into engagement with the dog or pawl 66. Thus it will be seen that each time the armature is attracted, the arm or member 40 will be released and will move forward until the pin or lug 55 strikes the lip or ear 50 and backward to its normal position, and when the armature is released, the arm or member 40 will be released to move in the opposite direction until the pin or lug 55 strikes the opposite ear or lip 50 and back again into its normal position. Thus it will be seen that each time the armature is attracted and released four vibrations are imparted to the respective arm or member 40; that is, a forward and backward movement when the armature moves in one direction, and a backward and forward movement when the armature moves in the opposite direction. The visual signal comprises two sets of characters, one set being arranged above the other. The upper set may display the box number if the box number contains the same number of digits as there are groups in the set, while the lower set may be utilized to repeat the number of the upper set. If desired, the upper set of numbers may be utilized to designate the box number, while the lower set may designate the badge number when the indicator is used as a police alarm.

In order that the invention might be fully understood by those skilled in the art, the details of the foregoing embodiment thereof have been thus specifically described but—

What I claim as new and desire to secure by Letters Patent is—

1. In an alarm, the combination of a visual and an audible signal apparatus, an electro responsive device for controlling each apparatus, means whereby one of said devices may be energized in advance of the other to display the visual signal, means for holding said signal exposed, and means for automatically releasing said visual signal.

2. In an alarm, the combination of a visual and an audible signal apparatus, an electro responsive device for controlling each apparatus, means whereby one of said devices may be energized in advance of the other to display the visual signal, means for holding said signal exposed, an electro responsive device for releasing said visual signal and means for energizing the last said electro responsive device.

3. In an alarm, the combination of a visual and an audible signal apparatus, an electro responsive device for controlling each apparatus, means whereby one of said devices may be energized in advance of the other to operate the visual signal, means for holding said signal exposed, an electro responsive device for releasing the visual signal and means for automatically placing the last said electro responsive device in the circuit of one of the first said electro responsive devices.

4. In an alarm, the combination of a visual and an audible signal apparatus, an electro responsive device for controlling each apparatus, means whereby said devices may be energized, said visual signal comprising a plurality of groups of independent characters, electro responsive devices for placing one of the first said electro responsive devices in the circuit of one of the first said devices to display the characters in said group, and means for automatically shifting the circuit to the electro responsive device of the other group and placing said device in the circuit of one of the first said devices to display the characters in said group.

5. In an alarm, the combination of a visual and an audible signal apparatus, an electro responsive device for controlling each apparatus, means whereby said devices may be energized, said visual signal comprising a plurality of groups of independent characters, electro responsive devices for placing one of the first said electro responsive devices in the circuit of one of the first said devices to display the characters in said group, means for automatically shifting the circuit to the electro responsive device of the other group and placing said device in the circuit of one of the first said devices to display the characters in said group, and means for concealing the characters in said group.

6. In an alarm, the combination of a visual and an audible signal apparatus, an electro responsive device for controlling each apparatus, means whereby said devices may be energized, said visual signal comprising a plurality of groups of independent characters, electro responsive devices for placing one of the first said electro responsive devices in the circuit of one of the first said devices to display the characters in said group, means for automatically shifting the circuit to the electro responsive device of the other group and placing said device in the circuit of one of the first said devices to display the characters in said group, means for holding the characters exposed, and automatic means for simultaneously concealing the characters of both of said groups.

7. In an alarm, the combination of a visual and an audible signal apparatus, an electro responsive device for controlling each apparatus, means whereby said devices may be energized, said visual signal comprising independent groups of characters, electro responsive devices for placing one of the first said electro responsive devices in the circuit of one of the first said devices to display the characters in said group, means for automatically shifting the circuit to the electro responsive device of the other group and placing said device in the circuit of one of the first said devices to display the characters in said group, means for holding the characters exposed, and an electro responsive device for automatically concealing the characters of said groups.

8. In an alarm, the combination of a visual and an audible signal apparatus, an electro responsive device for controlling each apparatus, means whereby said devices may be energized, said visual signal comprising independent groups of characters, electro responsive devices for placing one of the first said electro responsive devices in the circuit of one of the first said devices to display the characters in said group, means for automatically shifting the circuit to the electro responsive device of the other group and placing said device in the circuit of one of the first said devices to display the characters in said group, means for holding the characters exposed, an electro responsive device for causing the characters to be concealed, and means for shifting the current from the electro responsive device of one group to the last said electro responsive device.

9. In an alarm, the combination of a visual and an audible signal apparatus, an electro responsive device for controlling each of said signals, said visual signal comprising a plurality of groups of characters, each of said groups comprising a series of independent characters, an electro responsive device for controlling each group, means for successively placing the electro responsive devices in the circuit of one of the first electro responsive devices to display the characters therein, and means for automatically shifting the current to the electro responsive device of another group to display the characters therein, and an electro responsive device for concealing the exposed characters, the last said means being adapted to shift the current from the electro responsive device of the last group to the concealing electro responsive device.

10. In an alarm, the combination of a visual and an audible signal apparatus, an electro responsive device for controlling each of said signals, said visual signal comprising a plurality of groups of characters, each of said groups comprising a series of independent characters, an electro responsive device for each group for successively controlling the characters therein, means coöperating with the electro responsive devices for displaying a predetermined character in the respective group, means whereby one of the last said electro responsive devices may be placed in circuit with one of the first said electro responsive devices, and means for automatically shifting the current successively to the electro responsive device of the groups when the predetermined character of the respective group has been displayed.

11. In an alarm, the combination of a visual and an audible signal apparatus, an electro responsive device for controlling each of said signals, said visual signal comprising a plurality of groups of characters, each of said groups comprising a series of independent characters, an electro responsive device for each of the groups for successively controlling the characters therein, means coöperating with the electro responsive devices for displaying a predetermined character in the respective group, means whereby one of the last said electro responsive devices may be placed in circuit with one of the first said electro responsive devices, means for automatically shifting the current successively to the electro responsive device of the groups when the predetermined character of the respective group has been displayed, and automatic means for causing the exposed characters to assume their normal position.

12. In an alarm, the combination of a visual and an audible signal apparatus, an electro responsive device for controlling each of said signals, said visual signal comprising a plurality of groups of characters, each of said groups comprising a series of independent characters, an electro responsive device for successively controlling each group, means coöperating with the electro responsive devices for displaying a predetermined character in the respective group, means whereby one of the last said electro responsive devices may be placed in circuit with one of the first said electro responsive devices, means for automatically shifting the current successively to the electro responsive device of the groups when the predetermined character of the respective group has been displayed, an electro responsive releasing device for the characters and automatic means for shifting the current from the electro responsive device of the last group to the releasing device to cause the exposed characters to assume their normal position.

13. In an alarm, the combination of a visual and an audible signal apparatus, an electro responsive device for controlling each of said signals, said visual signal comprising a plurality of groups of independent series of characters, an electro responsive device for controlling each series, means whereby one of said devices may be placed in circuit with one of the first said electro responsive devices, means coöperating with the responsive device of each series to expose a predetermined character therein, means for shifting the current to the electro responsive devices of the successive groups, means for holding the character exposed, an electro responsive releasing device, means for shifting the current to the last said electro responsive device to release the characters, and means for automatically shifting the current from the releasing device to the operating electro responsive device of the first series of characters.

14. In an alarm, the combination of a visual and an audible signal apparatus, an electro responsive device for controlling each of said signals, said visual signal comprising a plurality of groups of independent characters, an electro responsive device for controlling each series, means whereby said devices may be placed in circuit with one of the first said electro responsive devices, an electro responsive device for simultaneously releasing the characters of the groups, means for shifting the circuit successively to the electro responsive devices of the remaining groups and to the releasing device, and means operatively related to the operating mechanism of the first group of characters for automatically shifting the circuit back to the electro responsive device of the first group.

15. In an alarm, the combination of a visual and an audible signal apparatus, an electro responsive device for controlling each of said signals, said visual signal comprising a plurality of groups of independent characters, an electro responsive device for controlling each series, means whereby said devices may be placed in circuit with one of the first said electro responsive devices, an electro responsive device for simultaneously releasing the characters of the groups, means for shifting the circuit successively to the electro responsive devices of the remaining groups, means for energizing the releasing device, and means operatively related to the operating mechanism of the first group of characters for automatically shifting the circuit back to the electro responsive device of the first group after the characters have been released.

16. In an alarm, the combination of a visual and an audible signal apparatus, an electro responsive device for controlling each of said signals, said visual signal comprising a plurality of groups of independent characters, an electro responsive device for each group for successively controlling the characters therein, a switch for placing the electro responsive device of one group in circuit with the electro responsive device of one of the signals, and means coöperating with the last said electro responsive device for operating the switch to successively energize the electro responsive devices of the separate groups.

17. In an alarm, the combination of a visual and an audible signal apparatus, an electro responsive device for controlling each of said signals, said visual signal comprising a plurality of groups of independent characters, an electro responsive device for controlling each group, a switch for placing the electro responsive device of one group in circuit with the electro responsive device of one of the signals, an electro responsive releasing device for the characters, and means for operating the switch to successively energize the electro responsive devices of the separate groups and the releasing device.

18. In an alarm, the combination of a visual and an audible signal apparatus, an electro responsive device for controlling each of said signals, said visual signal comprising a plurality of groups of independent characters, an electro responsive device for controlling each group, means whereby the electro responsive device of one group may be energized, a switch for controlling said device, an electro responsive releasing device, means operatively related to the electro responsive device of one of the signals for automatically shifting the switch to successively energize the devices of the remaining groups and the releasing device and means operatively related to the actuating mechanism of one of the groups for returning the switch to its normal position.

19. In combination in an alarm including a visual signal, an electro responsive device for controlling the signal, said signal comprising a plurality of groups of independent characters, an electro responsive device for controlling each group, means whereby the electro responsive device of one group may be energized, a switch for controlling said device, an electro responsive releasing device, means operatively related to the electro responsive device of the signal for moving the switch to successively energize the electro responsive devices of the various groups and for controlling the releasing device, a supplemental switch for controlling the circuit of the releasing device, and means operatively related to the last said means for operating said supplemental switch.

20. In combination in an alarm including a visual signal, an electro responsive device for controlling the signal, said signal comprising a plurality of groups of independent characters, an electro responsive device for controlling each group, means whereby the electro responsive device of one group may be energized, a switch for controlling said device, an electro responsive releasing device, means operatively related to the electro responsive device of the signal for moving the switch to successively energize the electro responsive devices of the various groups and for controlling the releasing device, a supplemental switch for controlling the circuit of the releasing device, means operatively related to the last said means for operating said supplemental switch, and means for automatically returning the first said switch to its normal position.

21. In combination, an alarm including a visual signal containing independent groups of characters, an electro responsive device for each group, means coöperating with each of said devices for displaying the characters in each group, a switch, operating mechanism for moving the switch to successively cause the electro responsive devices to be successively energized to display the characters in the respective group, common means for releasing said characters and positive means operatively related to the switch and the actuating mechanism of one of the groups for returning the switch to its normal position as the characters are released.

22. In combination, an alarm including a visual signal containing groups of independent characters, an electro responsive device for each group, a member for displaying the characters of each group, means operatively related to the electro responsive devices for moving the respective member to display the characters, means for locking the member and the characters in their adjusted position, means whereby said electro responsive devices may be energized, a switch, means for moving the switch to successively energize the electro responsive devices, a common releasing means, positive means operatively related to the switch and to one of the said members for returning the switch to its normal position when the characters are released, and means for returning the member to its normal position.

23. In combination, an alarm including a visual signal containing independent groups of characters, an electro responsive device for each group, means including a common switch whereby said devices may be energized, a member operatively related to the respective electro responsive devices for displaying and holding the characters displayed, a motor, means operatively related to the motor for moving the switch to shift the current from one of the electro responsive devices to the other, and means for controlling the motor.

24. In combination, an alarm including a visual signal containing independent groups of characters, an electro responsive device for each group, means including a common switch whereby said devices may be energized, a member operatively related to the respective devices for displaying the characters, a motor, means operatively related to the motor for moving the switch to shift the current from one of the electro responsive devices to the other, and means for controlling the motor, said means including mechanism for preventing the movement of the switch by the motor until the predetermined character in the respective group has been displayed.

25. In combination, an alarm including a visual signal containing independent groups of characters, an electro responsive device for each group, means including a common switch whereby said devices may be energized, a member operatively related to the respective devices for displaying the characters, a motor, means operatively related to the motor for moving the switch to shift the current from one of the electro responsive devices to the other, means for controlling the motor, said means including mechanism for preventing the movement of the switch by the motor until the predetermined character in the respective group has been displayed, and means for returning the switch operating means to its normal position.

26. In combination, an alarm including a visual signal containing independent groups of characters, an electro responsive device for each group, means including a switch whereby said devices may be energized, a member operatively related to each of the devices and adapted to be moved thereby to display the respective characters, means for locking the members and characters in their adjusted position, a motor, means operatively related to the motor for moving the switch to shift the current from one of the electro responsive devices to the other, means for controlling the motor, said means including mechanism for preventing the movement of the switch by the motor until the predetermined character in the respective group has been displayed, means for releasing the members and characters, means for returning the members to their normal position and means operatively related to one of the members for returning the switch to its normal position when said member is released.

27. In combination, an alarm including a visual signal comprising a plurality of independent series of characters, an operating member for each series, an electro responsive device for each member, means operatively related to said devices for displacing the member to display a predetermined character in each series, means including a switch whereby said electro responsive devices may be energized to displace the members, a motor, said motor including a shifting device, a member operatively related to the switch and the shifting device for moving the switch to direct the current through another of the electro responsive devices, and means for controlling the shifting device, said means being adapted to prevent the shifting device from moving the switch until the predetermined character in the respective group has been displayed.

28. In combination, an alarm including a visual signal comprising a plurality of independent series of characters, an operating member for each series, an electro responsive device for each member, means operatively related to said devices for displacing the member to display a predetermined character in each series, means including a switch whereby said electro responsive devices may be energized to displace the members, a motor, said motor including a shifting device, a member operatively related to the switch and the shifting device for moving the switch to direct the current through another of the electro responsive devices, means for controlling the shifting device, said means being adapted to prevent the shifting device from moving the switch until the predetermined character in the respective group has been displayed, and means for returning the last said member to its normal position.

29. In combination, an alarm including a visual signal comprising a plurality of independent series of characters, an operating member for each series, an electro responsive device for each member, means operatively related to said devices for displacing the member to display a predetermined character in each series, means including a switch whereby said electro responsive devices may be energized to displace the members, a motor, said motor including a shifting device, a member operatively related to the switch and the shifting device for moving the switch to direct the current through another of the electro responsive devices, means for controlling the shifting device, said means being adapted to prevent the shifting device from moving the switch until the predetermined character in the respective group has been displayed, means for returning the last said member to its normal position and means for returning the switch to its normal position.

30. In combination, an alarm including a visual signal comprising a plurality of independent series of characters, an operating member for each series, an electro responsive device for each member, means operatively related to said device for displacing the member to display the characters, means for locking the members and characters in their adjusted position, means for releasing and means for returning the members when released, means including a switch whereby said electro responsive device may be energized to displace the members, a motor, said motor including a shifting device, means operatively related to the shifting device and the switch for moving the latter to direct the current through another of the electro responsive devices, means for controlling the shifting device, said means being adapted to prevent the shifting device from moving the switch until a predetermined character in the respective group has been displayed, means for returning the last said member to its normal position and means operatively related to one of the first said members for returning the switch to its normal position.

31. In combination, an alarm, including a visual signal comprising a plurality of sets of independent characters, means for successively displaying the characters, electro responsive devices for controlling said means, means including a switch whereby said devices may be energized, a motor, said motor comprising a feeding screw, a member provided with a projection, means for normally holding the projection in such a position within the groove of the screw as to lock the motor, said member being adapted to engage and move the switch to shift the current to another of the electro responsive devices, and means for disengaging the projection from the screw to release the motor, said means being adapted to intermittently lift the projection from the screw and to permit said projection to engage with the screw for each impulse which sets up a number, said projection being adapted to be moved by the screw when in engagement therewith to shift the switch when the said character is exposed.

32. In combination an alarm, including a visual signal comprising a plurality of sets of independent characters, means for successively displaying said characters, electro responsive devices for controlling said means, means including a switch whereby the said electro responsive devices may be energized, a motor including a worm screw, a member provided with a projection, means for normally holding the projection within the groove, said projection being adapted to engage the end of the groove to lock the motor, means adapted to intermittently move the projection out of engagement with the groove to release the motor until the predetermined character has been displayed, said means being also adapted to seat the projection in the groove to permit the screw to move the member into engagement with the switch to shift the latter and direct the current through another of the electro responsive devices, and means tending normally to hold the projection adjacent the feeding end of the screw.

33. In combination, a fire alarm including a visual signal comprising a plurality of independent designating characters, means for normally concealing said characters, an operating member, means operatively related to said member for successively displaying said characters, means for imparting an intermittent movement to said member, means for locking said member and the characters in their adjusted position, means for releasing the member to unlock the characters, and means for returning the member to its normal position.

34. In combination, a fire alarm including a visual signal comprising a plurality of independently pivoted characters, a plurality of pivotally supported operating members, interengaging means on the characters and the respective operating members, an additional member, means operatively related to the last said member adapted to engage and move the operating members to display the characters when the said additional member is moved, means for transmitting an intermittent movement to the last said member, means for locking the parts in their adjusted positions, means for releasing and means for returning the parts to their normal position.

35. In combination, a fire alarm including a visual signal comprising a plurality of independently pivoted characters, a plurality of pivotally supported operating members, interengaging means on the characters and the respective operating members, an additional member, means operatively related to the last said member adapted to engage and move the operating members to display the characters when the said additional member is moved, ratchet mechanism for intermittently moving the last said member, means for locking the parts in their adjusted position, automatic means for releasing the parts and means for returning the said parts to their normal position.

36. In combination, a fire alarm including a visual signal comprising a plurality of independent designating characters, means for normally concealing said characters, a rotatable operating member, means for imparting an intermittent rotation to the member, means operatively related to the rotatable member for successively displaying the characters, means for locking the characters and the member in their adjusted position, means for releasing the parts and means for causing the parts to assume their normal position.

37. In combination, a fire alarm including a visual signal comprising a plurality of independent designating characters, means for normally concealing said characters, an operating member, means operatively related to said member for successively displaying said characters, electro responsive means for imparting an intermittent movement to said member, means for locking said member and the characters in their adjusted position, electro responsive means for releasing the characters and the member, and means for returning the parts to their normal position.

38. In combination, a fire alarm including a visual signal comprising a plurality of independent designating characters, means for normally concealing said characters, an operating member, means operatively related to said member for successively displaying said characters, electro responsive means for imparting an intermittent movement to said member, means for locking said member and the characters in their adjusted position, electro responsive means for releasing the characters and the member, means for automatically shifting the current from the first said electro responsive device to the electro responsive releasing device, and means for returning the parts to their normal position.

39. In combination, a fire alarm including a visual signal comprising a plurality of independent characters, means for normally concealing said characters, pivoted segments coöperating with said characters, an operating member, means operatively related to said member adapted to engage and move the segments to successively display the characters when the operating member is moved, means for imparting a step by step movement to the member, an electro responsive device for controlling the last said means, means for locking the parts in their adjusted position, releasing mechanism for the member and characters, electro responsive means for controlling the releasing mechanism, means for returning the member to its normal position and means operatively related to the member for controlling the circuit in its operating electro responsive actuating device.

40. In combination, a fire alarm including a visual signal comprising a plurality of independent characters, means for normally concealing said characters, pivoted segments coöperating with said characters, a rotary operating member, spaced cams on said member adapted to respectively engage and move the segments to successively display the characters when the operating member is rotated, means for imparting a step by step movement to the member, an electro responsive device for controlling the last said means, means for locking the parts in their adjusted position, releasing mechanism for the member and characters, electro responsive means for controlling the releasing mechanism, means for returning the member to its normal position and means operatively related to the member for controlling the circuit in its operating electro responsive actuating device.

41. In combination, a fire alarm including a visual signal comprising a plurality of independent character members, means for normally concealing said members, pivoted segments coöperating with the members, means for guiding said segments and for preventing lateral displacement thereof with relation to the member, an operating member, means operatively related to the last said member adapted to respectively engage and move the segments to successively display the characters when the operating member is moved, means for imparting a step by step movement to the operating member, an electro responsive device for controlling the said operating member, means for locking the parts in their adjusted position, releasing mechanism for the operating member and the first said members, electro responsive means for controlling the releasing mechanism, means for returning the members to their normal position, and means operatively related to the operating member for controlling the circuit of its electro responsive actuating device.

42. In an alarm, the combination of a visual and an audible signal apparatus, said audible signal including a bell hammer, electro responsive means for controlling each apparatus, means whereby said devices may be energized, means for securing the hammer out of operative position, and means for indicating the nature of the alarm.

43. In an alarm, the combination of a visual and an audible signal apparatus, said audible signal including a bell hammer, electro responsive means for controlling each apparatus, means whereby said devices may be energized, means for securing the hammer out of operative position, an indicator for designating the nature of the alarm, and means operatively related to the audible signal apparatus for exposing said indicator.

44. In an alarm, the combination of a visual and an audible signal apparatus, said audible signal including a bell hammer, electro responsive means for controlling each apparatus, means whereby said devices may be energized, means for securing the hammer out of operative position, an indicator for designating the nature of the alarm, means for exposing said indicator, means for locking the indicator in an exposed position, and means for releasing said indicator.

45. In an alarm, the combination of a visual and an audible signal apparatus, said audible signal including a bell hammer, electro responsive means for controlling each apparatus, means whereby said devices may be energized, means for securing the hammer out of operative position, an indicator for designating the nature of the alarm, means for exposing said indicator, means for locking the indicator in an exposed position, and means operatively related to the visual signal apparatus for releasing the indicator.

46. In combination in an alarm, including an operating motor, an escapement for the motor, releasing mechanism for the escapement, an electro responsive device including an armature for operating the releasing mechanism to permit an intermittent movement of the motor, and means for permitting a forward and backward movement of the releasing mechanism during the movement of the armature in either direction.

47. In combination, an alarm including an operating motor, an escapement for the motor, a releasing member for the escapement, a member for locking the releasing member to prevent movement of the escapement, an electro responsive device, means operatively related to the locking member and controlled by the electro responsive device for unlocking the releasing member, and means whereby said escapement will impart a vibratory movement to the releasing member when the latter is unlocked.

48. In combination, an alarm including an operating motor, an escapement for the motor, a releasing member for the escapement, a member for locking the releasing member to prevent movement of the escapement, an electro responsive device, means operatively related to the locking member and controlled by the electro responsive device for unlocking the releasing member, means whereby said escapement will impart a vibratory movement to the releasing member when the latter is unlocked, and means for limiting the movement of the said releasing member.

In testimony whereof I have signed my name to this specification, in the presence of two subscribing witnesses, on this 16th day of March A. D. 1907.

GUSTAF P. LEONARD.

Witnesses:
CHARLES A. PRESSNALL,
ELLA H. HENDERSON.